United States Patent
Tokaldani et al.

(10) Patent No.: US 12,249,848 B2
(45) Date of Patent: Mar. 11, 2025

(54) INTEGRATED TRANSMITTER-TRANSFORMER FOR WIRELESS CHARGING

(71) Applicant: AIRA, INC., Chandler, AZ (US)

(72) Inventors: Mohammad Ali Saket Tokaldani, Vancouver (CA); Eric Heindel Goodchild, Phoenix, AZ (US)

(73) Assignee: AIRA, INC., Phoenix, AZ (US)

( * ) Notice: Subject to any disclaimer, the term of this patent is extended or adjusted under 35 U.S.C. 154(b) by 552 days.

(21) Appl. No.: 17/678,902

(22) Filed: Feb. 23, 2022

(65) Prior Publication Data

US 2022/0271570 A1   Aug. 25, 2022

Related U.S. Application Data

(60) Provisional application No. 63/153,366, filed on Feb. 24, 2021.

(51) Int. Cl.
| | | |
|---|---|---|
| *H01F 27/28* | (2006.01) | |
| *H02J 50/00* | (2016.01) | |
| *H02J 50/10* | (2016.01) | |
| *H02J 50/40* | (2016.01) | |

(52) U.S. Cl.
CPC ......... *H02J 50/402* (2020.01); *H02J 50/005* (2020.01); *H02J 50/10* (2016.02)

(58) Field of Classification Search
CPC .......... H02J 50/40; H02J 50/402; H02J 50/10; H02J 50/00; H02J 50/005
See application file for complete search history.

(56) References Cited

U.S. PATENT DOCUMENTS

| | | |
|---|---|---|
| 2007/0159284 A1 | 7/2007 | Chang |
| 2007/0247083 A1 | 10/2007 | Ger et al. |
| 2008/0278112 A1 | 11/2008 | Hui et al. |
| 2012/0025934 A1 | 2/2012 | McGuire |
| 2012/0126799 A1 | 5/2012 | Schatz et al. |
| 2012/0294043 A1* | 11/2012 | Juds ...................... H02M 3/156 363/15 |

(Continued)

FOREIGN PATENT DOCUMENTS

EP       1233430 A1    8/2002

OTHER PUBLICATIONS

PCT/US22/21894. International Search Report (May 3, 2022).
PCT/US22/017630, International Search Report (May 3, 2022).

*Primary Examiner* — Alfonso Perez Borroto
*Assistant Examiner* — Esayas G Yeshaw
(74) *Attorney, Agent, or Firm* — LOZA & LOZA, LLP; Anthony G. Smyth

(57) ABSTRACT

Systems, methods and apparatus for wireless charging are disclosed. A charging device includes a power transmitting coil, a transformer and a driver circuit. The power transmitting coil may be configured to produce an electromagnetic flux centered on an axis that is substantially perpendicular to a plane surface of the planar magnetic core. The transformer may be located adjacent to the planar magnetic core and the driver circuit may be configured to use a stepped-up voltage received from the transformer to provide a charging current to the power transmitting coil. The transformer may include a magnetic half-core that contacts the planar magnetic core such that the planar magnetic core completes a magnetic path through the magnetic half-core.

16 Claims, 16 Drawing Sheets

(56) References Cited

U.S. PATENT DOCUMENTS

| | | | |
|---|---|---|---|
| 2013/0229064 A1* | 9/2013 | Moon | H02J 50/12 |
| | | | 307/104 |
| 2015/0077052 A1 | 3/2015 | Hui | |
| 2019/0267828 A1 | 8/2019 | Goodchild et al. | |
| 2019/0386504 A1* | 12/2019 | Yao | H02J 13/00026 |
| 2021/0083525 A1* | 3/2021 | Stingu | G01R 33/0206 |
| 2022/0399154 A1* | 12/2022 | Urruticoechea De Miguel | |
| | | | H01F 19/04 |

\* cited by examiner

INTEGRATED TRANSMITTER-TRANSFORMER FOR WIRELESS CHARGING

PRIORITY CLAIM

This application claims priority to and the benefit of provisional patent application No. 63/153,366 filed in the United States Patent Office on Feb. 24, 2021 and the entire content of this application is incorporated herein by reference as if fully set forth below in its entirety and for all applicable purposes.

TECHNICAL FIELD

The present invention relates generally to wireless charging of batteries, including batteries in mobile computing devices, and more particularly to increasing wirelessly transmitted power levels using a low voltage input power.

BACKGROUND

Wireless charging systems have been deployed to enable certain types of devices to charge internal batteries without the use of a physical charging connection. Devices that can take advantage of wireless charging include mobile processing and/or communication devices. Standards, such as the Qi standard defined by the Wireless Power Consortium enable devices manufactured by a first supplier to be wirelessly charged using a charger manufactured by a second supplier. Standards for wireless charging are optimized for relatively simple configurations of devices and tend to provide basic charging capabilities.

Improvements in wireless charging capabilities are required to support continually increasing complexity of mobile devices and changing form factors and to support new uses of wireless charging devices. For example, there is a need to improve operability of wireless charging devices when used with low voltage power sources.

DETAILED DESCRIPTION

Figure 1:
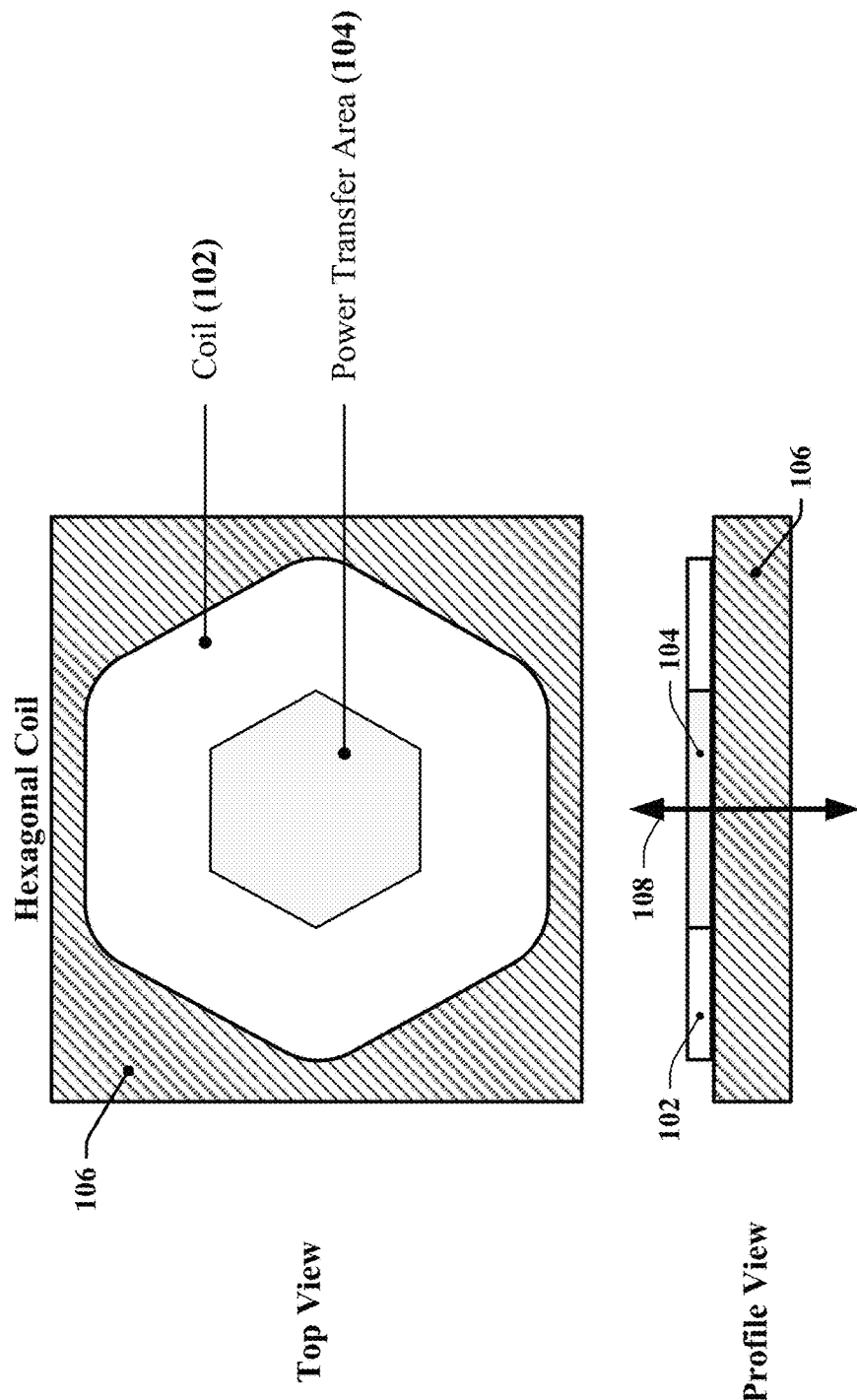
FIG. 1 illustrates an example of a charging cell on a charging surface provided by a wireless charging device in accordance with certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of wireless charging systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium. A processor-readable storage medium, which may also be referred to herein as a computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), Near Field Communications (NFC) token, random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Overview

Certain aspects of the present disclosure relate to wireless charging devices and associated systems, apparatus and methods to that provide a free-positioning charging surface using multiple transmitting coils or that can concurrently charge multiple receiving devices. In one aspect, a controller in the wireless charging device can locate a device to be charged and can configure one or more optimally positioned transmitting coils to deliver power to the receiving device. Charging cells may be provisioned or configured with one or more inductive transmitting coils. Multiple charging cells may be arranged or configured to provide the charging surface. The location of a device to be charged may be detected through sensing techniques that correlate or associate the location of the device with changes in a physical characteristic at a known location on the charging surface. In some examples, sensing of location may be implemented using capacitive, resistive, inductive, touch, pressure, load, strain, and/or another appropriate type of sensing.

In one aspect of the disclosure, an apparatus has a battery charging power source at a low voltage level that inhibits the apparatus from providing higher power wireless transfers. Each charging cell in the plurality of charging cells may include one or more coils surrounding a power transfer area. Each coil may include multiple coaxial windings provided in different metal layers of a printed circuit board (PCB) in the charging device. The plurality of charging cells may be arranged adjacent to the charging surface of the charging device without overlap of the charging cells.

In one example, the charging device includes a charging circuit, at least one printed circuit board, and one or more charging cells configured to receive a charging current from the charging circuit and to transmit power to a receiving device when a charging current is received from the charging circuit. In one example, the charging device includes a power transmitting coil having a planar magnetic core, a transformer having a magnetic half-core that is located adjacent to the planar magnetic core such that the planar magnetic core completes a magnetic path through the magnetic half-core, and a driver circuit configured to use a stepped-up voltage received from the transformer to provide a charging current to the power transmitting coil. The planar magnetic core may be located in a plane parallel to a plane of the power transmitting coil, the power transmitting coil overlapping at least a portion of the planar magnetic core. The planar magnetic core may be located in a plane parallel to a surface of a printed circuit board that carries the power transmitting coil.

Charging Cells

According to certain aspects disclosed herein, a charging device may be provided using charging cells that are deployed adjacent to a surface of the charging device. In one example, the charging cells are deployed in accordance with a honeycomb packaging configuration. A charging cell may be implemented using one or more coils that can each induce a magnetic field along an axis that is substantially orthogonal to the surface of the charging device and adjacent to the coil. In this description, a charging cell may refer to an element having one or more coils where each coil is configured to produce an electromagnetic field that is additive with respect to the fields produced by other coils in the charging cell and directed along or proximate to a common axis.

In some implementations, a charging cell includes coils that are stacked along a common axis and/or that overlap such that they contribute to the magnetic field that is induced substantially orthogonal to the surface of the charging device. In some implementations, a charging cell includes coils that are arranged within a defined portion of the surface of the charging device and that contribute to an induced magnetic field within the substantially orthogonal portion of the surface of the charging device associated with the charging cell. In some implementations, charging cells may be configurable by providing an activating current to coils that are included in a dynamically defined charging cell. For example, a charging device may include multiple stacks of coils deployed across a surface of the charging device and the charging device may be configured to detect the location of a device to be charged based on proximity to one or more stacks of coils. The charging device may select some combination of the stacks of coils to define or provide a charging cell adjacent to the device to be charged. In some instances, a charging cell may include, or be characterized as a single coil. In many instances, a charging cell may include multiple stacked coils and/or multiple adjacent coils or stacks of coils. The coils may be referred to herein as charging coils, wireless charging coils, transmitter coils, transmitting coils, power transmitting coils, power transmitter coils, or the like.

FIG. 1 illustrates an example of a charging cell 100 that may be deployed and/or configured to provide a charging surface of a charging device. In this disclosure, a charging surface may be understood to include an array of charging cells 100 provided on one or more substrates 106. A circuit comprising one or more integrated circuits (ICs) and/or discrete electronic components may be provided on one or more of the substrates 106. The circuit may include drivers and switches used to control currents provided to coils used to transmit power to a receiving device. The circuit may be configured as a processing circuit that includes one or more processors and/or one or more controllers that can be configured to perform certain functions disclosed herein. In some instances, some or all of the processing circuit may be provided external to the charging device. In some instances, a power supply may be coupled to the charging device.

The charging cell 100 may be provided in close proximity to an outer surface area of the charging device, upon which one or more devices can be placed for charging. The charging device may include multiple instances of the charging cell 100. In one example, the charging cell 100 has a substantially hexagonal shape that delimits or encloses one or more coils 102. Each coil may be constructed using conductors, wires or circuit board traces that can receive a current sufficient to produce an electromagnetic field in a power transfer area 104. In various implementations, some coils 102 may have an overall shape that is substantially polygonal, including the hexagonal charging cell 100 illustrated in FIG. 1. Other implementations provide coils 102 that are circular or elliptical in form have other shapes. The shape of the coils 102 may be determined at least in part by the number of windings in the coil, capabilities or limitations of fabrication technology, and/or to optimize layout of the charging cells on a substrate 106 such as a printed circuit board substrate. Each coil 102 may be implemented using wires, printed circuit board traces and/or other connectors in a spiral configuration. Each charging cell 100 may span two or more layers separated by an insulator or substrate 106 such that coils 102 in different layers are centered around a common axis 108.

Figure 2:
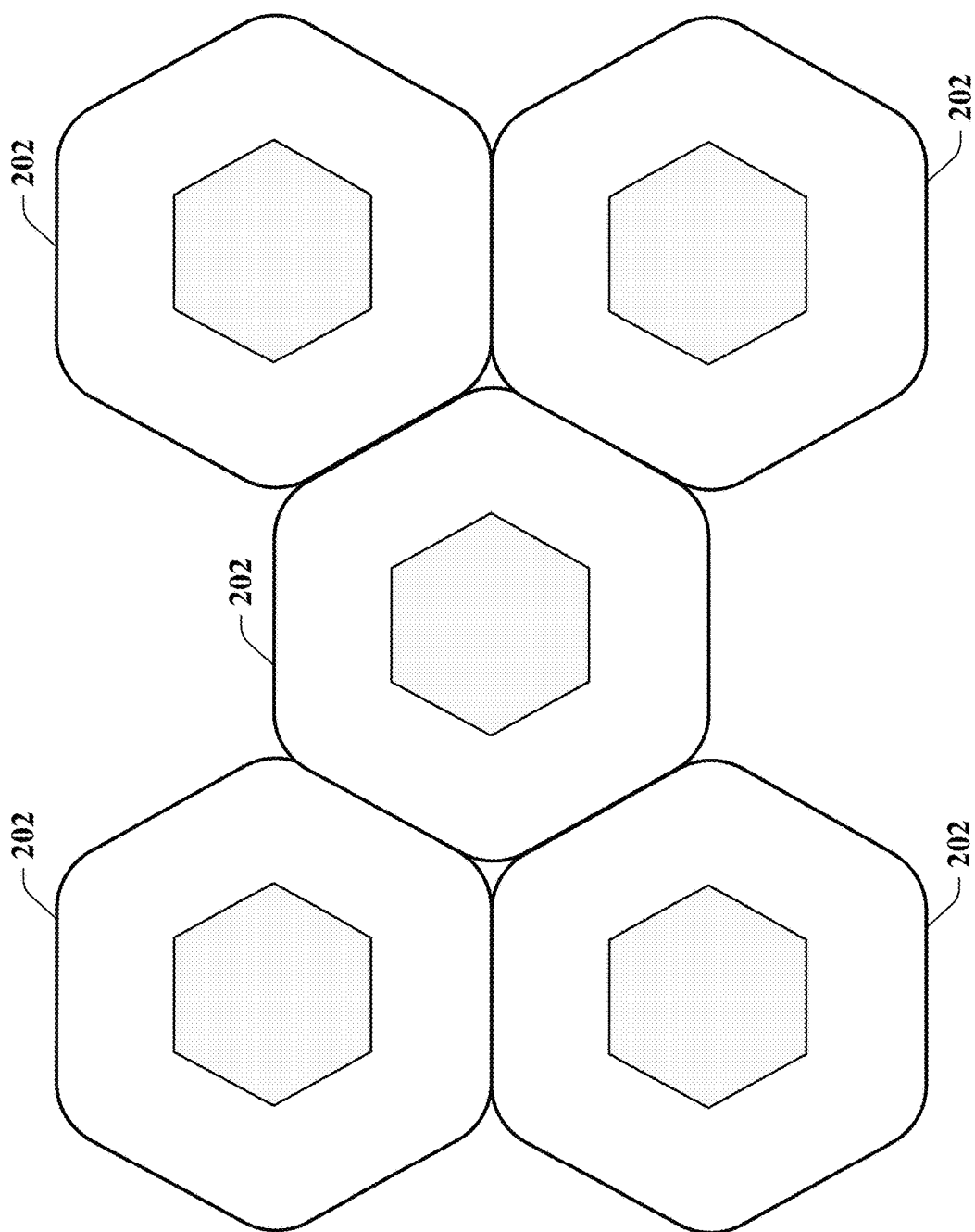
FIG. 2 illustrates an example of an arrangement of charging cells provided on a single layer of a segment of a charging surface provided by a wireless charging device that may be adapted in accordance with certain aspects disclosed herein.

FIG. 2 illustrates an example of an arrangement 200 of charging cells 202 provided on a single layer of a segment or portion of a charging surface that may be included in a charging system that has been adapted in accordance with certain aspects disclosed herein. The charging cells 202 are arranged according to a honeycomb packaging configuration. In this example, the charging cells 202 are arranged end-to-end without overlap. This arrangement can be provided without through-holes or wire interconnects. Other arrangements are possible, including arrangements in which some portion of the charging cells 202 overlap. For example, wires of two or more coils may be interleaved or overlaid to some extent.

Figure 3:
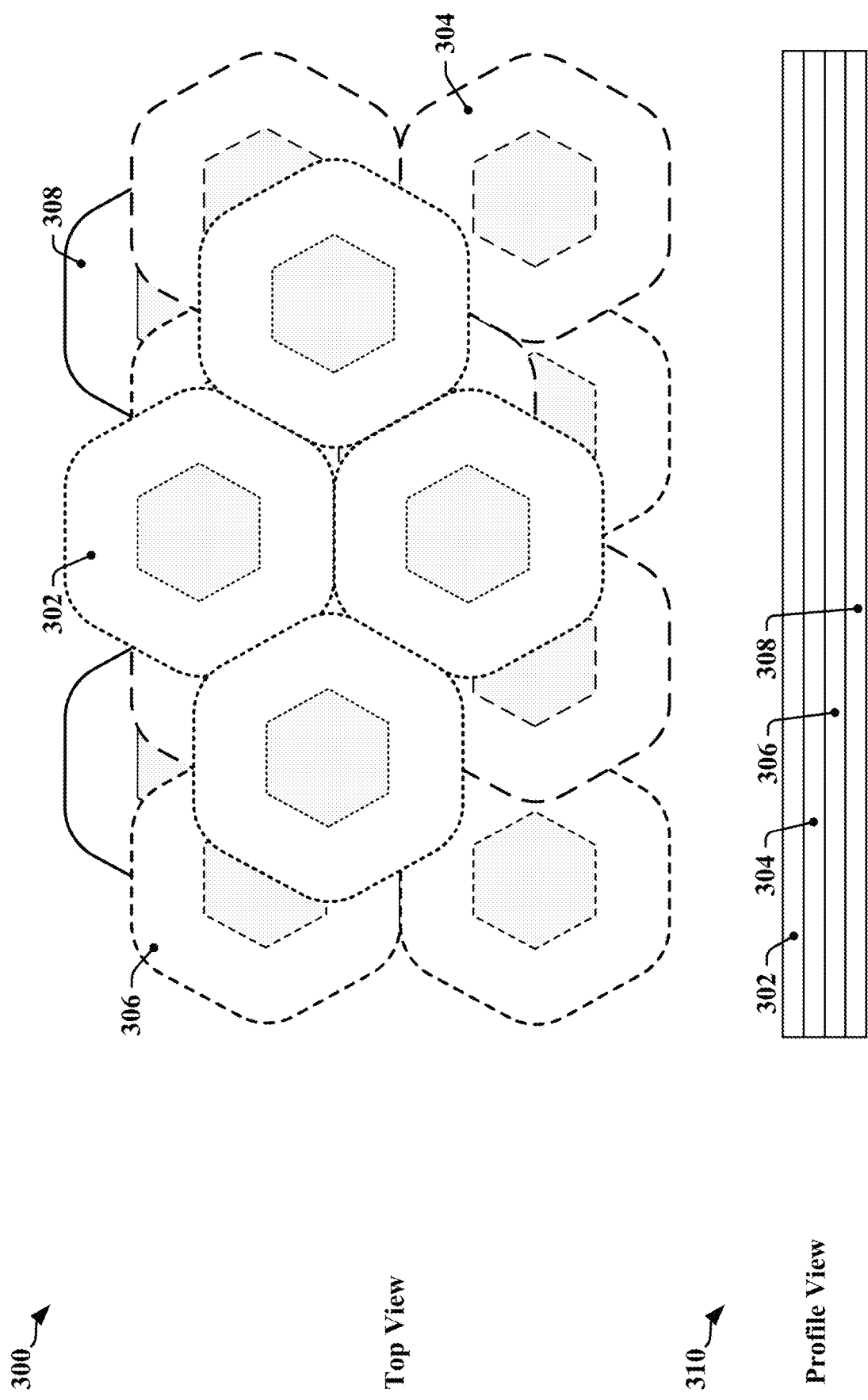
FIG. 3 illustrates an example of an arrangement of charging cells when multiple layers of charging cells are overlaid within a segment of a charging surface provided by a wireless charging device that may be adapted in accordance with certain aspects disclosed herein.

FIG. 3 illustrates an example of an arrangement of charging cells from two perspectives 300, 310 when multiple layers are overlaid within a segment or portion of a charging surface in accordance with certain aspects disclosed herein. In this example, four layers of charging cells 302, 304, 306, 308 are provided within a segment of a charging surface. The charging cells within each layer of charging cells 302, 304, 306, 308 are arranged according to a honeycomb packaging configuration. In one example, the layers of charging cells 302, 304, 306, 308 may be formed on a printed circuit board that has four or more copper layers. The arrangement of charging cells 100 can be selected to provide complete coverage of a designated charging area that is adjacent to the illustrated segment.

Figure 4:
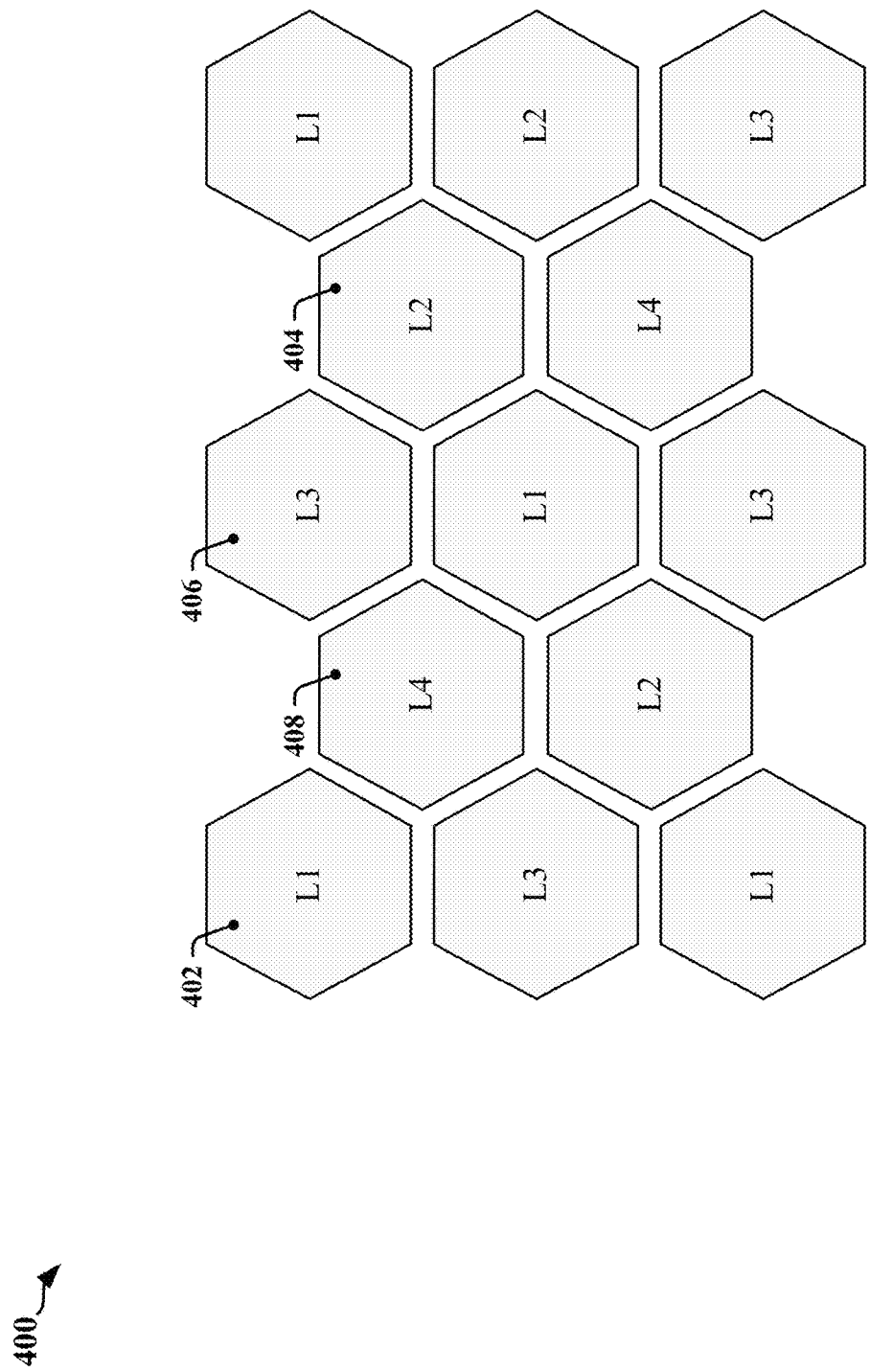
FIG. 4 illustrates the arrangement of power transfer areas provided by a charging surface of a charging device that employs multiple layers of charging cells configured in accordance with certain aspects disclosed herein.

FIG. 4 illustrates the arrangement of power transfer areas defined or configured in a charging surface 400 provided by a charging system in accordance with certain aspects disclosed herein. The illustrated charging surface 400 is constructed using four layers of charging cells 402, 404, 406, 408. In FIG. 4, each power transfer area provided by a charging cell in the first layer of charging cells 402 is marked "L1", each power transfer area provided by a charging cell in the second layer of charging cells 404 is marked "L2", each power transfer area provided by a charging cell in the third layer of charging cells 406 is marked "L3", and each power transfer area provided by a charging cell in the fourth layer of charging cells 408 is marked "L4".

Wireless Transmitter

Figure 5:
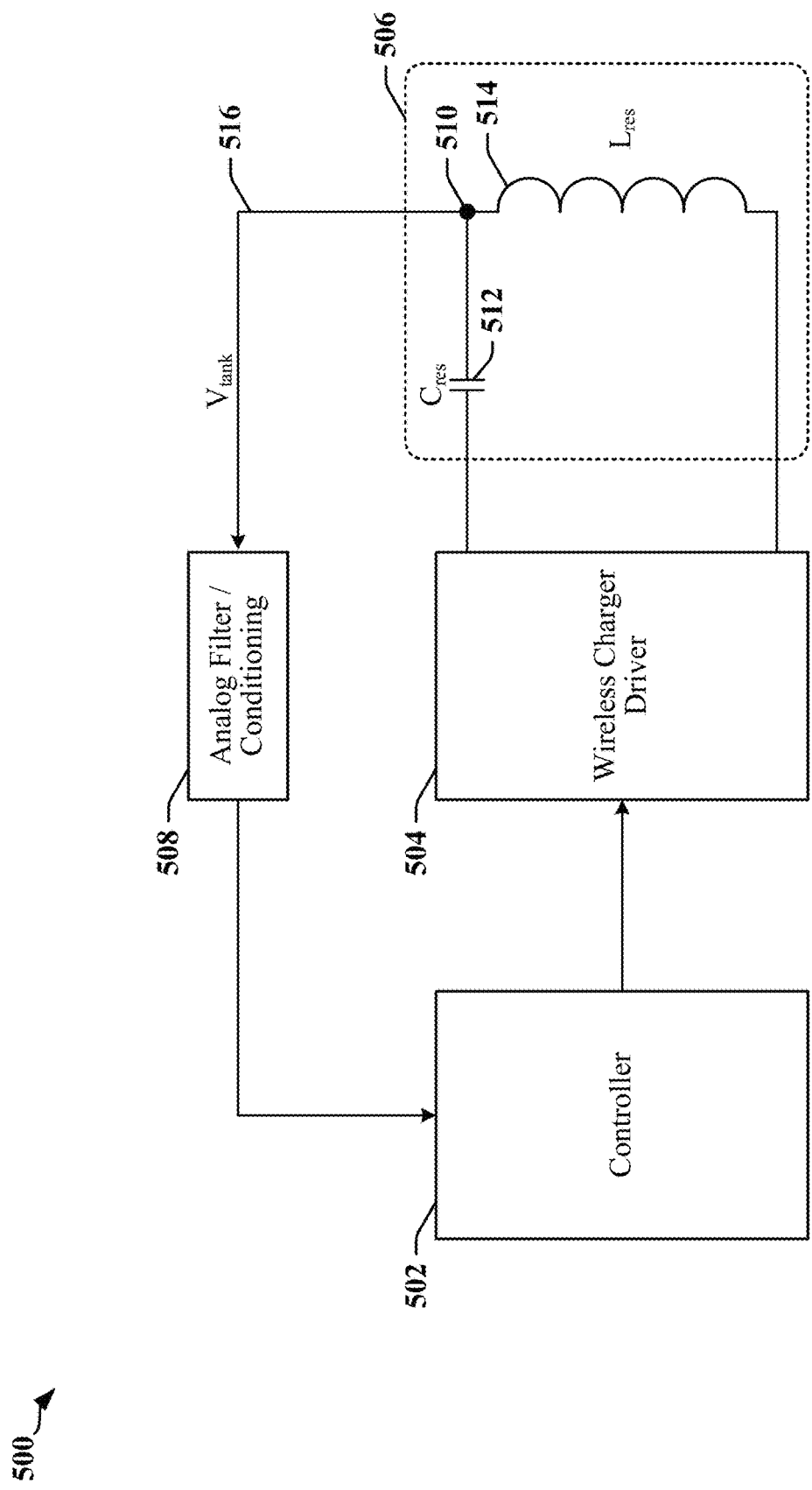
FIG. 5 illustrates a wireless power transmitter that may be provided in a charger base station in accordance with certain aspects disclosed herein.

FIG. 5 illustrates certain aspects of a wireless transmitter 500 that may be provided in a base station of a wireless charging device. A base station in a wireless charging device may include one or more processing circuits used to control operations of the wireless charging device. A controller 502 may receive a feedback signal filtered or otherwise processed by a filter circuit 508. The controller may control the operation of a driver circuit 504 that provides an alternating current to a resonant circuit 506. In some examples, the controller 502 generates a digital frequency reference signal used to control the frequency of the alternating current output by the driver circuit 504. In some instances, the digital frequency reference signal may be generated using a programmable counter or the like. In some examples, the driver circuit 504 includes a power inverter circuit and one or more power amplifiers that cooperate to generate the alternating current from a direct current source or input. In some examples, the digital frequency reference signal may be generated by the driver circuit 504 or by another circuit. The resonant circuit 506 includes a capacitor 512 and inductor 514. The inductor 514 may represent or include one or more transmitting coils in a charging cell that produced a magnetic flux responsive to the alternating current. The resonant circuit 506 may also be referred to herein as a tank circuit, LC tank circuit, or LC tank, and the voltage 516 measured at an LC node 510 of the resonant circuit 506 may be referred to as the tank voltage.

Passive ping techniques may use the voltage and/or current measured or observed at the LC node 510 to identify the presence of a receiving coil in proximity to the charging pad of a device adapted in accordance with certain aspects disclosed herein. Some conventional wireless charging devices include circuits that measure voltage at the LC node 510 of the resonant circuit 506 or the current in the resonant circuit 506. These voltages and currents may be monitored for power regulation purposes and/or to support communication between devices. According to certain aspects of this disclosure, voltage at the LC node 510 in the wireless transmitter 500 illustrated in FIG. 5 may be monitored to support passive ping techniques that can detect presence of a chargeable device or other object based on response of the resonant circuit 506 to a short burst of energy (the ping) transmitted through the resonant circuit 506.

A passive ping discovery technique may be used to provide fast, low-power discovery. A passive ping may be produced by driving a low-energy, fast pulse through a network that includes the resonant circuit 506. The fast pulse excites the resonant circuit 506 and causes the network to oscillate at its natural resonant frequency until the injected energy decays and is dissipated. The response of a resonant circuit 506 to a fast pulse may be determined in part by the resonant frequency of the resonant LC circuit. A response of the resonant circuit 506 to a passive ping that has initial voltage=$V_0$ may be represented by the voltage VLC observed at the LC node 510, such that:

$$V_{LC} = V_0 e^{-\left(\frac{\omega}{2Q}\right)t} \tag{Eq. 1}$$

The resonant circuit 506 may be monitored when the controller 502 or another processor is using digital pings to detect presence of objects. A digital ping is produced by driving the resonant circuit 506 for a period of time. The resonant circuit 506 is a tuned network that includes a transmitting coil of the wireless charging device. A receiving device may modulate the voltage or current observed in the resonant circuit 506 by modifying the impedance presented by its power receiving circuit in accordance with signaling state of a modulating signal. The controller 502 or other processor then waits for a data modulated response that indicates that a receiving device is nearby.

Selectively Activating Coils

According to certain aspects disclosed herein, power transmitting coils in one or more charging cells may be selectively activated to provide an optimal electromagnetic field for charging a compatible device. In some instances, power transmitting coils may be assigned to charging cells, and some charging cells may overlap other charging cells. The optimal charging configuration may be selected at the charging cell level. In some examples, a charging configuration may include charging cells in a charging surface that are determined to be aligned with or located close to the device to be charged. A controller may activate a single power transmitting coil or a combination of power transmitting coils based on the charging configuration which in turn is based on detection of location of the device to be charged. In some implementations, a wireless charging device may have a driver circuit that can selectively activate one or more power transmitting coils or one or more predefined charging cells during a charging event.

Figure 6:
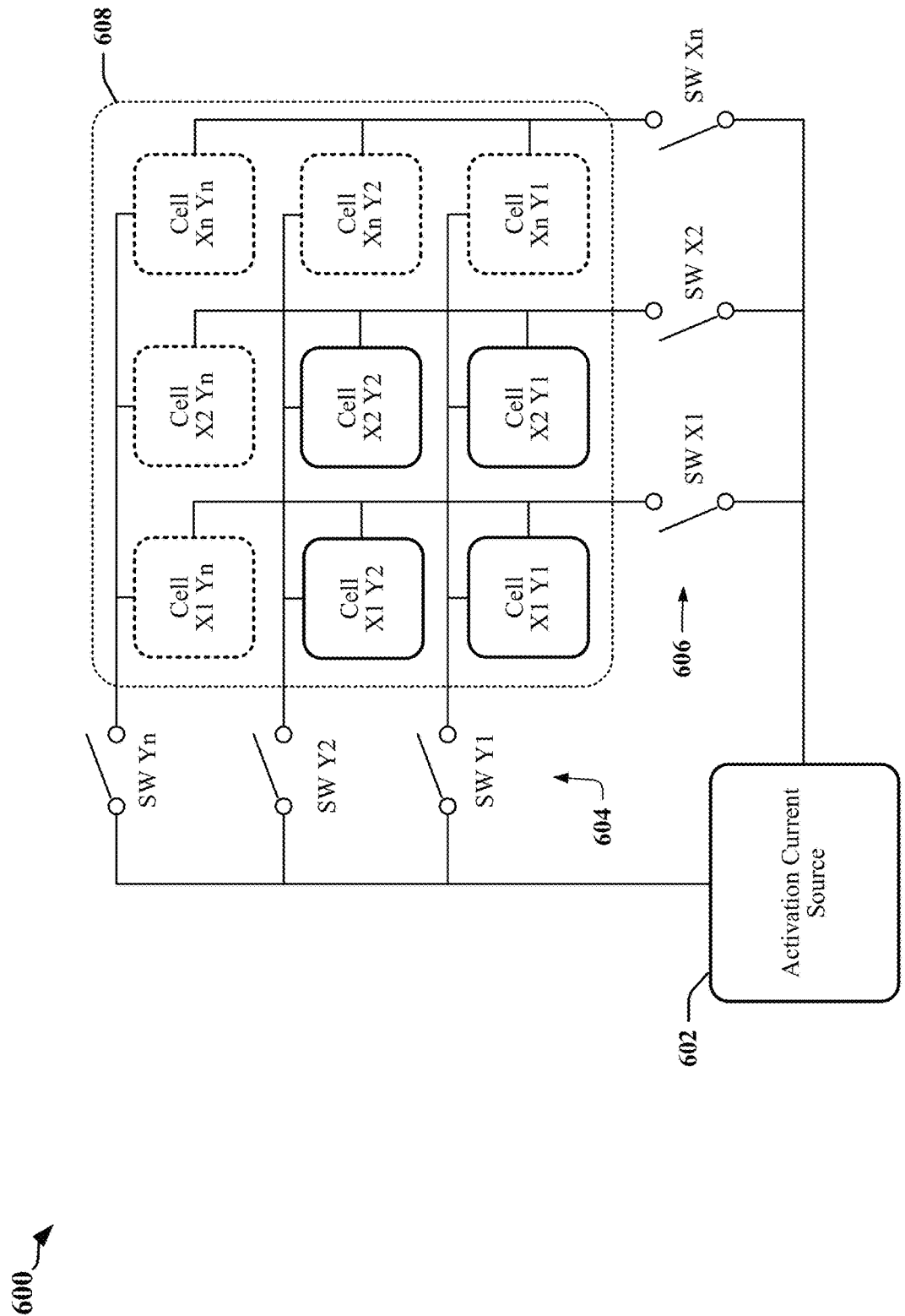
FIG. 6 illustrates a first topology that supports matrix multiplexed switching for use in a wireless charging device adapted in accordance with certain aspects disclosed herein.

FIG. 6 illustrates a first topology 600 that supports matrix multiplexed switching for use in a wireless charging device adapted in accordance with certain aspects disclosed herein. The wireless charging device may select one or more charging cells 100 to charge a receiving device. Charging cells 100 that are not in use can be disconnected from current flow. A relatively large number of charging cells 100 may be used in the honeycomb packaging configuration illustrated in FIGS. 2 and 3, requiring a corresponding number of switches. According to certain aspects disclosed herein, the charging cells 100 may be logically arranged in a matrix 608 having multiple cells connected to two or more switches that enable specific cells to be powered. In the illustrated topology 600, a two-dimensional matrix 608 is provided, where the dimensions may be represented by X and Y coordinates. Each of a first set of switches 606 is configured to selectively couple a first terminal of each cell in a column of cells to a first terminal of a voltage or current source 602 that provides current to activate coils in one or more charging cells during wireless charging. Each of a second set of switches 604 is configured to selectively couple a second terminal of each cell in a row of cells to a second terminal of the voltage or current source 602. A charging cell is active when both terminals of the cell are coupled to the voltage or current source 602. The use of a matrix 608 can significantly reduce the number of switching components needed to operate a network of tuned LC circuits. For example, N individually connected cells require at least N switches, whereas a two-dimensional matrix 608 having N cells can be operated with $\sqrt{N}$ switches. The use of a matrix 608 can produce significant cost savings and reduce circuit and/or layout complexity. In one example, a 9-cell implementation can be implemented in a 3×3 matrix 608 using 6 switches, saving 3 switches. In another example, a 16-cell implementation can be implemented in a 4×4 matrix 608 using 8 switches, saving 8 switches.

During operation, at least 2 switches are closed to actively couple one coil or charging cell to the voltage or current source 602. Multiple switches can be closed at once in order to facilitate connection of multiple coils or charging cells to the voltage or current source 602. Multiple switches may be closed, for example, to enable modes of operation that drive multiple transmitting coils when transferring power to a receiving device.

Figure 7:
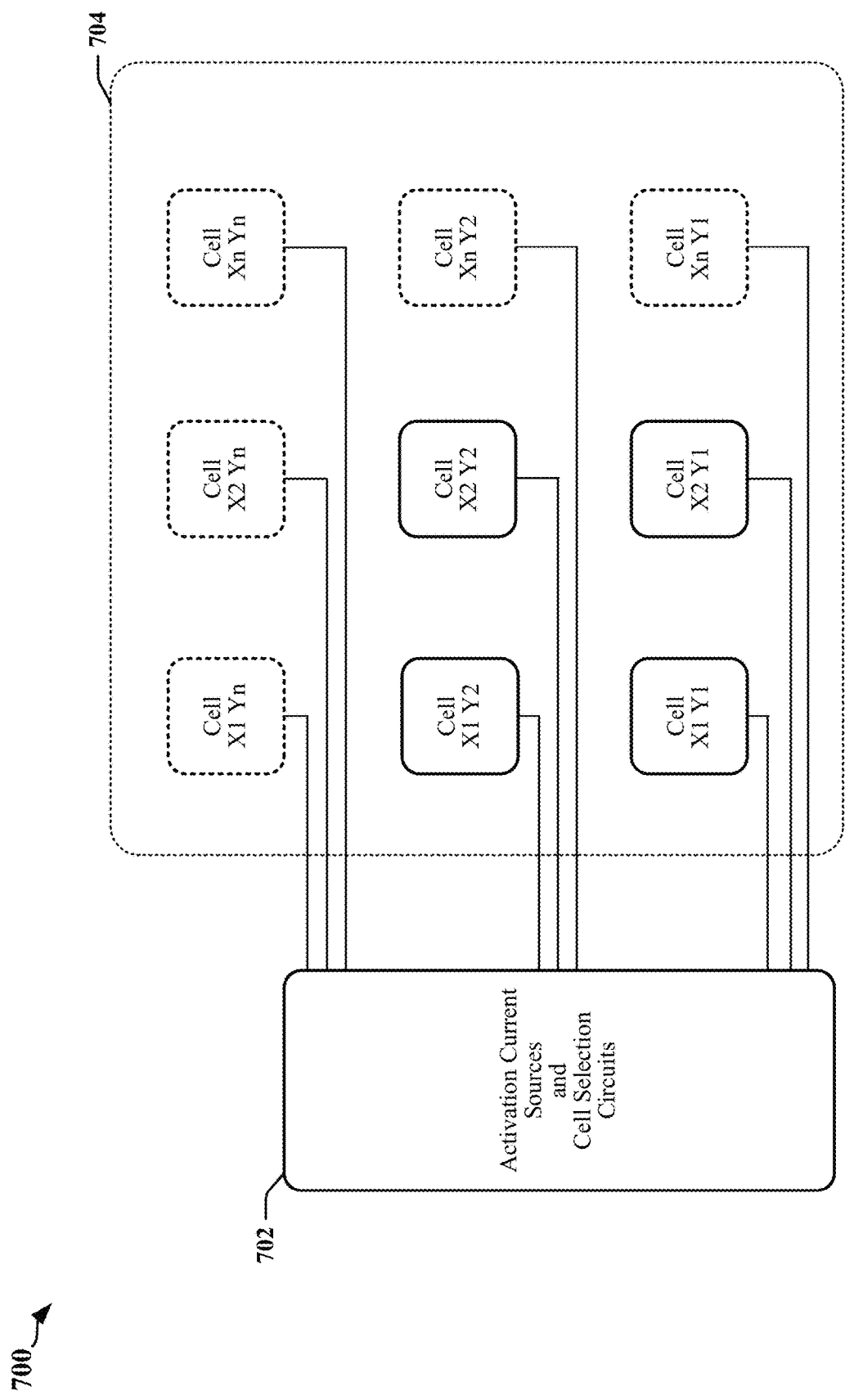
FIG. 7 illustrates a second topology that supports direct current drive in a wireless charging device adapted in accordance with certain aspects disclosed herein.

FIG. 7 illustrates a second topology 700 in which each individual coil or charging cell is directly driven by a driver circuit 702 in accordance with certain aspects disclosed herein. The driver circuit 702 may be configured to select one or more coils or charging cells 100 from a group of coils 704 to charge a receiving device. It will be appreciated that the concepts disclosed here in relation to charging cells 100 may be applied to selective activation of individual coils or stacks of coils. Charging cells 100 that are not in use receive no current flow. A relatively large number of charging cells 100 may be in use and a switching matrix may be employed to drive individual coils or groups of coils. In one example, a first switching matrix may configure connections that define a charging cell or group of coils to be used during a charging event and a second switching matrix may be used to activate the charging cell and/or group of selected coils.

Figure 8:
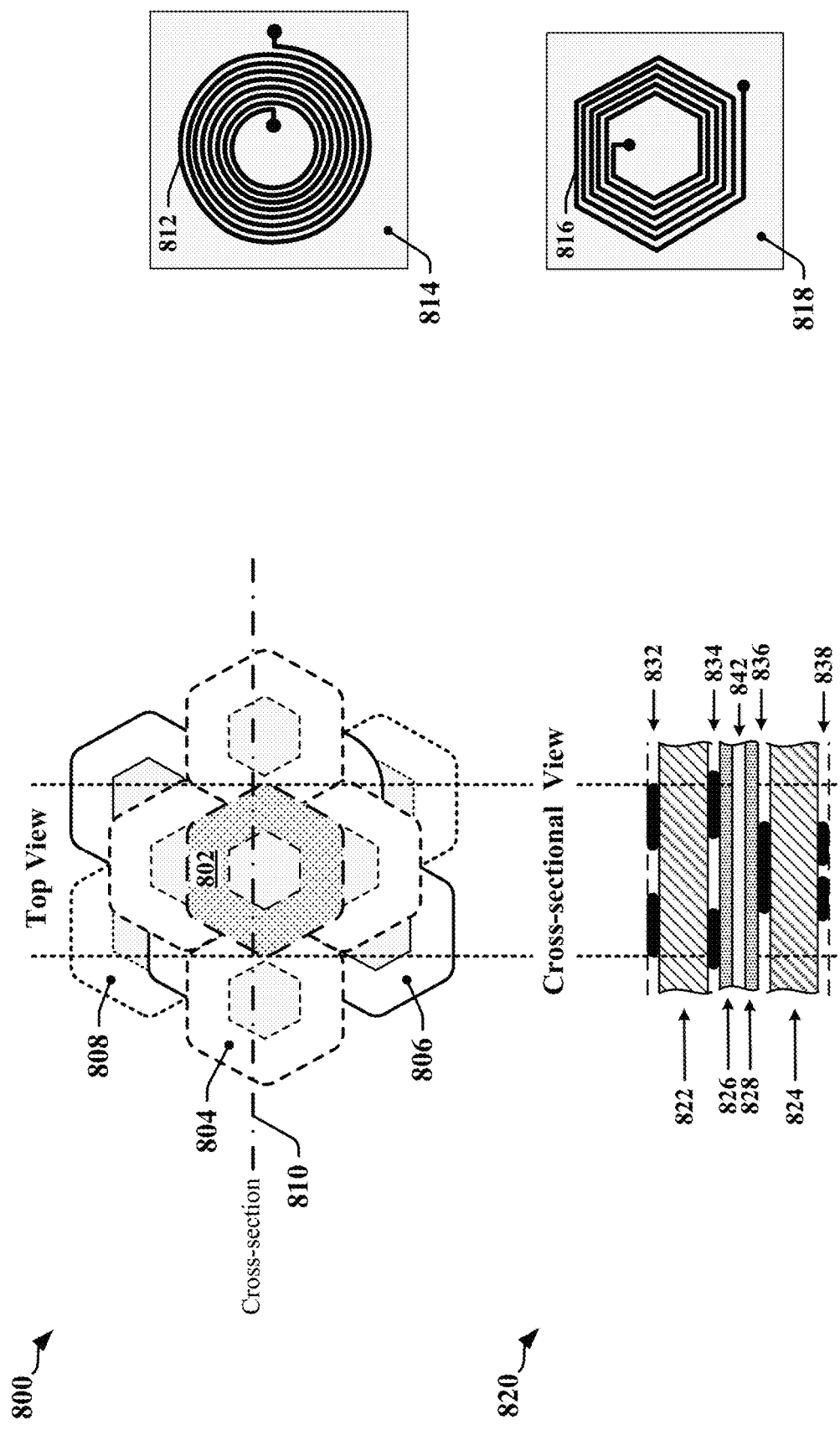
FIG. 8 illustrates a charging cell layout configured in accordance with certain aspects of this disclosure.

FIG. 8 illustrates a charging cell layout 800 configured in accordance with certain aspects of this disclosure. In the illustrated example, the charging cell layout 800 is provided using a four-layer structure implemented on the metal layers of a pair of two-layer PCBs 822 or 824 that are bonded or joined by an insulating adhesive layer 826. In other examples, the four-layer structure may be implemented on the metal layers of a single four-layer PCB.

In the illustrated example, an active charging cell 802 is provided on a first layer of a four-layer structure and charging cells 804, 806, 808 provided on the other three layers may have windings that overlap the windings of the active charging cell 802. In one example, each charging cell includes a transmitting coil that has a winding formed as a decreasing radius trace 812 or 816 on one side of a PCB 822 or 824. In one example, the decreasing radius trace 812 has a substantially smooth curved spiral shape. In another example, the decreasing radius trace 816 is segmented and generally hexagonal in shape. The decreasing radius traces 812 and 816 may be provided adjacent a magnetic core material 814 and 818, respectively. The magnetic core material 814 and 818 may be formed from a low coercivity material such as a soft ferrite. In one example, the magnetic core material 814 and 818 is integrated in an adhesive layer. In another example, the magnetic core material 814 and 818 may be attached to an adhesive layer or sandwiched between adhesive layers.

A partial view 820 of a lateral cross-section 810 of a pair of two-layer PCBs 822 or 824 illustrates further aspects of charging cell layout 800. In some examples, a charging cell 804 in the second layer, a charging cell 806 in the third layer and a charging cell 808 in the second layer partially overlap the active charging cell 802. Areas of the metal layers 832, 834, 836 and 838 occupied by windings are shown in solid black, with individual traces not being explicitly shown. Each of the metal layers 832, 834, 836 and 838 is provided on a side of a PCB 822 or 824. A planar magnetic core 842 is provided between the two adjacent metal layers 834 and 836 of the PCBs 822 and 824. The planar magnetic core 842 may be included in an adhesive layer or between adhesive layers 826, 828. The planar magnetic core 842 and the adhesive layers 826, 828 are electrically non-conductive.

Challenges facing conventional single-coil and multi-coil wireless charging systems include an inability to deliver full power under all operating conditions. A wireless charging device may be unable to deliver full power to a receiving device when it receives input power at a reduced voltage or with low current limits. For example, low power conditions may occur in vehicles when the power source for the wireless charging device is provided at a nominal 12V. In this example, the voltage of the power source can decrease below 12V when supplied by a vehicle battery that is in a partially discharged state.

In another example, a wireless charging device may be unable to deliver full power to a receiving device when there is a weak or non-optimal coupling between transmitting and receiving coils. Quality of coupling may be determined by the degree of alignment between transmitting and receiving coils, distance between transmitting and receiving coils and presence of a material between the transmitting and receiving coils. In the latter example, the material may correspond to a cover or case of a receiving device. A weak coupling may prevent the wireless charging device from delivering the power requested by the receiving device. For example, poor coupling may occur in a free-position wireless charging device due to offsets in alignment between transmitting and receiving coils.

Increasing demands for higher power transfers in wireless charging devices impose multiple challenges in the design of transmitters in wireless charging devices. Conventional receiving devices may demand up to 5 W maximum from the transmitter, while next generations of receiving devices can demand 15 W or more to expedite the charging process.

Certain aspects of this disclosure enable wireless charging devices to increase the level of power that can be transmitted to receiving devices. Transmitted power may be increased through improved control over the voltage provided to the wireless transmitter. In one example, the wireless charging device may include circuits that can step-up the input voltage received by the wireless charging device to supply higher voltages to the wireless transmitter that result in higher power transmissions. In another example, the wireless charging device may include circuits that can stabilize or adjust the voltage provided to the transmitter.

According to certain aspects, a wireless power transmitting system may include circuits that can ensure that the voltage applied to the wireless transmitter is maintained at a level defined by a charging configuration. In one example, the charging configuration defines a voltage level to be used for power transmission. The defined voltage level may be selected based on a preconfigured or minimum voltage level. In some examples, a wireless power transmitting system configured in accordance with certain aspects of this disclosure includes circuits that can boost voltages in unstable voltage conditions or when the charging configuration defines a higher voltage level when increased power transmission is desired. These voltage boosting circuits may include transformers that are integrated with wireless power transmitting coils.

Figure 9:
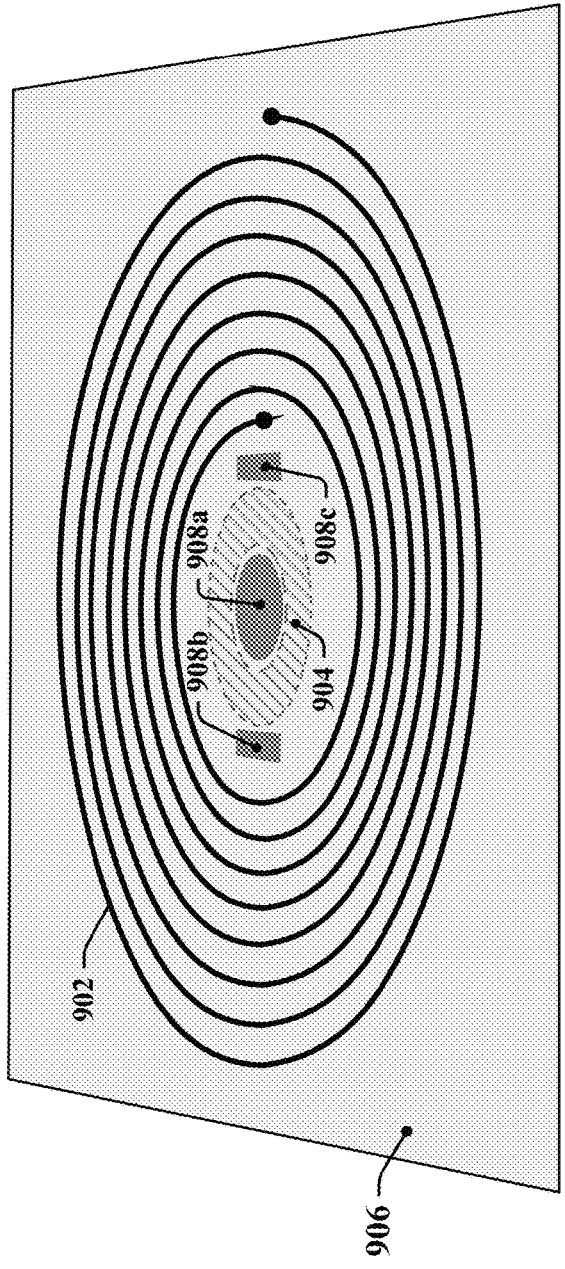
FIG. 9 illustrates the surface of a charging cell provided in accordance with certain aspects of this disclosure.
Figure 9:
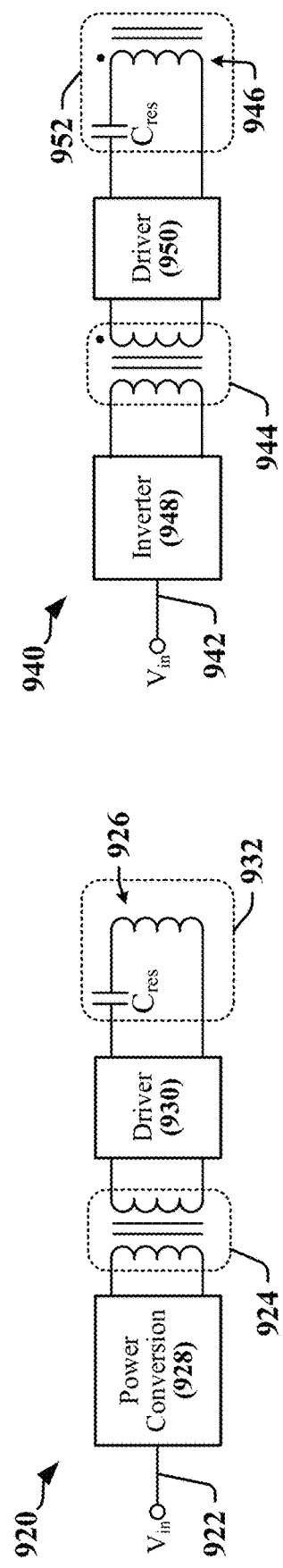

FIG. 9 illustrates certain aspects of a charging cell 900 provided in a wireless charging device in accordance with certain aspects of this disclosure. An integrated planar transformer may be used to step-up the voltage received as an input to the wireless charging device. The ability to step up the input voltage enables the charging cell 900 to transmit sufficient power to satisfy requests received from a power receiving device. The planar transformer enables the driver circuit to support increased maximum power demands under all expected conditions.

The planar transformer has a magnetic core that is formed from a combination of a ferrite E-shaped magnetic core and a planar transmitter magnetic core 906. In the illustrated example, the transmitter magnetic core 906 is formed from a planar sheet of ferrite material that is provided below the transmitting coil 902 of the charging cell 900. The ferrite in the transmitter magnetic core 906 has low coercivity and high resistivity. The ends of three posts 908a, 908b, 908c of the ferrite E-shaped partial magnetic core contact the underside of the transmitter magnetic core 906 completing the magnetic core of the planar transformer. Transformer windings 904 may be provided around the center post 908a. The transformer windings 904 include a primary winding that induces a magnetic flux that flows through a path provided by the E-shaped magnetic core and the transmitter magnetic core 906.

In some examples, the transformer windings 904 are provided on one or more circuit boards. In some examples, wire is wound around the center post 908a to provide one or more of the transformer windings 904. In some examples, the transmitting coil 902 at least partially overlaps the transformer windings 904. In some examples, the transmitting coil 902 is coaxially aligned with the transformer windings 904. In some examples, the transmitting coil 902 is unaligned with the transformer windings 904 and there is no overlap of the transmitting coil 902 and the transformer windings 904. In some examples, one planar transformer can be the source of current provided to multiple transmitting coils 902.

FIG. 9 illustrates certain aspects of a transmitting circuit 920 that includes a transformer 924 and transmitting coil 926. The transformer 924 and transmitting coil 926 share the transmitter magnetic core. A power conversion circuit 928 receives an input 922 and provides an alternating current (AC) signal to the primary winding of the transformer 924. The power conversion circuit 928 may include power conditioning circuits. The power conversion circuit 928 may include or cooperate with the transformer 924 to transform the input 922 to provide a stable AC input to the driver circuit 930. The driver circuit 930 may be configured to provide a current to a resonant circuit 932 that includes one or more transmitting coils 926. In one example, the driver circuit 930 provides the current at the resonant frequency of the resonant circuit 932. In some examples, the power conversion circuit 928 drives the transformer at the resonant frequency of the resonant circuit 932.

FIG. 9 illustrates certain aspects of a transmitting circuit 940 that includes a transformer 944 and transmitting coil 946. The transformer 944 and transmitting coil 946 share the transmitter magnetic core. The transformer 944 and transmitting coil 946 may be magnetically coupled. In one example, the transformer 944 and transmitting coil 946 may be magnetically coupled when they are located in coaxial alignment or when they overlap to an extent that some flux passes through the transmitting coil 946 and one of the windings of the transformer 944. An inverter 948 receives a direct current (DC) input 942 and provides an AC signal to the primary winding of the transformer 944. The inverter 948 may include or be coupled to power conditioning circuits. The inverter may include or cooperate with the transformer 944 to convert the direct current (DC) input 942 to provide an AC input to the driver circuit 950. The driver circuit 950 may be configured to provide a current to a resonant circuit 952 that includes one or more transmitting coils 946. In one example, the driver circuit 950 provides the current at the resonant frequency of the resonant circuit 952. In some examples, the inverter 948 drives the transformer at the resonant frequency of the resonant circuit 952.

Figure 10:
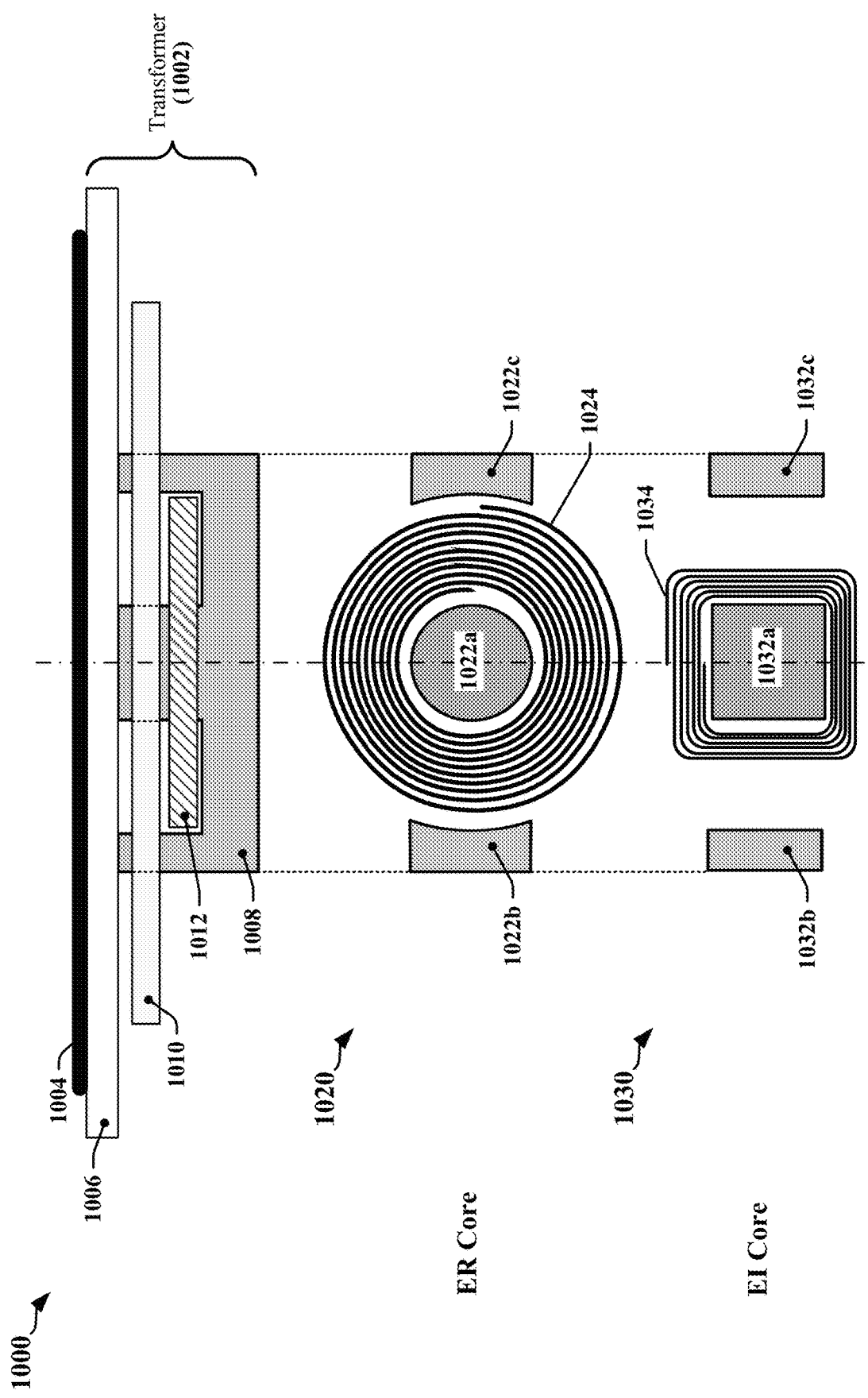
FIG. 10 illustrates a first example of a charging cell that includes an integrated transmitter-transformer structure in accordance with certain aspects of this disclosure.

FIG. 10 illustrates a first example of a charging cell 1000 that includes an integrated transmitter-transformer structure configured in accordance with certain aspects of this disclosure. The charging cell 1000 includes a transformer 1002. The transformer 1002 has a magnetic core that includes an E-shaped section 1008. The magnetic core of the transformer 1002 is completed by a planar magnetic core 1006 that closes off or otherwise completes the flux path provided by the E-shaped section 1008. The charging cell 1000 includes a wireless power transmitter that is configurable to wirelessly transmit power to a receiving chargeable device. In the illustrated example, the wireless power transmitter is implemented using a transmitting coil 1004 that is provided above the planar magnetic core 1006. The wireless power transmitter and the transformer 1002 share or overlap at least a portion of the planar magnetic core 1006. In the illustrated example, the transmitting coil 1004 is deposited on the planar magnetic core 1006 or may be bonded to the planar magnetic core 1006. In other examples, the transmitting coil 1004 is provided in a metal layer on one surface of a PCB and the planar magnetic core 1006 is provided on an opposing surface of the PCB.

In the illustrated example, the transformer 1002 has transformer windings that are provided on one or more PCBs 1010, 1012. In various implementations, the transformer windings are deployed or configured to surround or encircle a center post of the E-shaped section 1008 of the magnetic core of the transformer 1002. The center post of the E-shaped section 1008 may pass through holes provided in the PCBs 1010, 1012 in order to contact the planar magnetic core 1006 or to reduce the spacing between the center post and the planar magnetic core 1006. In the illustrated example, one PCB 1112 is configured to fit within the closed ends of the E-shaped section 1008. In some examples, the ferrite portions of the E-shaped section 1008 may pass through multiple holes provided in at least one PCB 1010. In some examples, the entire E-shaped section 1008 may pass through a large hole provided in one or more PCBs (not shown), including a PCB that carries elements of control, detection, measurement and/or portions of certain power conversion circuits. In various examples, the PCBs 1010, 1012 may be fastened together using adhesive, tape, clamps or other suitable fasteners. In some instances, the PCBs 1010, 1012 may fastened together and to the planar magnetic core 1006 using adhesive, tape, clamps or other suitable fasteners.

In a first example 1020, the E-shaped section 1008 is configured as an ER core that has a substantially round center post 1022a and outer posts 1022b, 1022c. The inner surfaces of the outer posts 1022b, 1022c are configured as segments of a cylindrical wall. The round center post 1022a may be suited for use with spiral transformer windings 1024.

In a second example 1030, the E-shaped section 1008 is configured as an EI core that has a substantially square or rectangular center post 1032a and substantially rectangular outer posts 1032b, 1032c. The square or rectangular center post 1032a may be suited for use with transformer windings 1034 that are configured to include straight sections with right angle turns. The structure of the center post 1022a, 1032a and layout of the transformer windings 1024, 1034 need not match. For example, the hexagonal shape of the decreasing radius trace 816 illustrated in FIG. 8 may be accommodated by the round center post 1022a or by the rectangular center post 1032a.

The transformer windings 1024, 1034 include primary windings and secondary windings. The primary windings and secondary windings can be provided on different PCBs 1010, 1012, on different surfaces of the same PCB 1010, 1012 or on the same surface of the same PCB 1010, 1012.

The E-shaped section 1008 illustrated in FIG. 10 may be referred to as a transformer half-core and may be used with PCBs 1010, 1012 that have holes configured to receive or pass the posts 1022a-1022c or 1032a-1032c of a transformer half-core. Transformer half-cores can have any desired geometry. The shape, size and location of each transformer half-core can be selected based on winding geometry, the number of charging cells to be supported, the number of transformers 1002 to be provided, available PCB space and other application parameters. A transformer 1002 can be constructed or deployed at any location under the planar magnetic core 1006 without regard to the location of the transmitter coil 1004. Multiple transformers 1002 and wireless power transmitters can share the same planar magnetic core 1006. A portion of planar magnetic core 1006 is shared when it provides a path for flux generated concurrently by a transformer 1002 and flux generated by a wireless power transmitter. Each transformer 1002 can be uniquely associated with a half-core and transformers 1002 may be placed at different locations under the planar magnetic core 1006 based on circuit needs, available space and other factors or application requirements.

Figure 11:
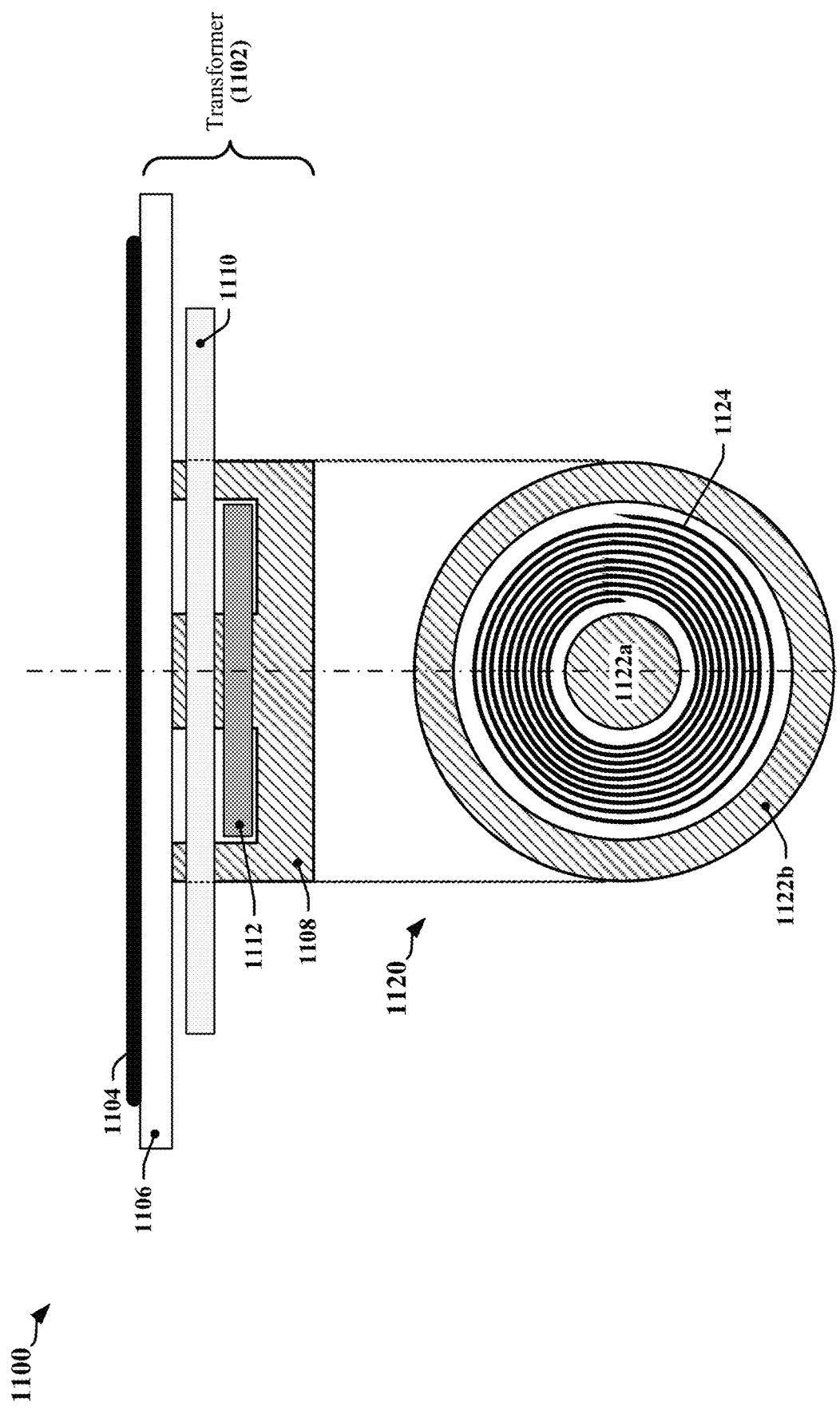
FIG. 11 illustrates a second example of a charging cell that includes an integrated transmitter-transformer structure in accordance with certain aspects of this disclosure.

FIG. 11 illustrates a second example of a charging cell 1100 that includes an integrated transmitter-transformer structure configured in accordance with certain aspects of this disclosure. The charging cell 1100 includes a transformer 1102. The transformer 1102 has a magnetic core that includes an E-shaped section 1108. The magnetic core of the transformer 1102 is completed by a planar magnetic core 1106 that closes off or otherwise completes the flux path provided by the E-shaped section 1108. The charging cell 1100 includes a wireless power transmitter that is configurable to wirelessly transmit power to a receiving chargeable device. In the illustrated example, the wireless power transmitter is implemented using a transmitting coil 1104 that is provided above the planar magnetic core 1106. The wireless power transmitter and the transformer 1102 share or overlap at least a portion of the planar magnetic core 1106. In the illustrated example, the transmitting coil 1104 is deposited on the planar magnetic core 1106 or may be bonded to the planar magnetic core 1106. In other examples, the transmitting coil 1104 is provided in a metal layer on one surface of a PCB and the planar magnetic core 1106 is provided on an opposing surface of the PCB.

In the illustrated example, the transformer 1102 has transformer windings that are provided on one or more PCBs 1110, 1112. In various implementations, the transformer windings are deployed or configured to surround or encircle a center post of the E-shaped section 1108 of the magnetic core of the transformer 1102. The center post of the E-shaped section 1108 may pass through holes provided in the PCBs 1110, 1112 in order to contact the planar magnetic core 1106 or to reduce the spacing between the center post and the planar magnetic core 1106. In the illustrated example, one PCB 1112 is configured to fit within the closed ends of the E-shaped section 1108. In some examples, the ferrite portions of the E-shaped section 1108 may pass through multiple holes provided in at least one PCB 1110. In some examples, the entire E-shaped section 1108 may pass through a large hole provided in one or more PCBs (not shown), including a PCB that carries elements of control, detection, measurement and/or portions of certain power conversion circuits. In various examples, the PCBs 1110, 1112 may be fastened together using adhesive, tape, clamps or other suitable fasteners. In some instances, the PCBs 1110, 1112 may fastened together and to the planar magnetic core 1106 using adhesive, tape, clamps or other suitable fasteners.

In one example 1120, the E-shaped section 1108 has a substantially round center post 1122a and a cylindrical wall 1122b. The round center post 1122a may be suited for use with spiral transformer windings 1124. In other examples, the center post may have a cross-section that is oblong, polygonal, square or rectangular. The structure of the center post 1122a and the layout of the transformer windings 1124 need not match. For example, the hexagonal shape of the decreasing radius trace 816 illustrated in FIG. 8 may be accommodated by the round center post 1122a or by a rectangular or polygonal center post.

The transformer windings 1124 include primary windings and secondary windings. The primary windings and secondary windings can be provided on different PCBs 1110, 1112, on different surfaces of the same PCB 1110, 1112 or on the same surface of the same PCB 1110, 1112.

A transformer 1102 can be constructed or deployed at any location under the planar magnetic core 1106 without regard to the location of the transmitting coil 1104. Multiple transformers 1102 and wireless power transmitters can share the same planar magnetic core 1106. A portion of planar magnetic core 1106 is shared when it provides a path for flux generated concurrently by a transformer 1102 and flux generated by a wireless power transmitter. Each transformer 1102 can be uniquely associated with a half-core and transformers 1102 may be placed at different locations under the planar magnetic core 1106 based on circuit needs, available space and other factors or application requirements.

Figure 12:
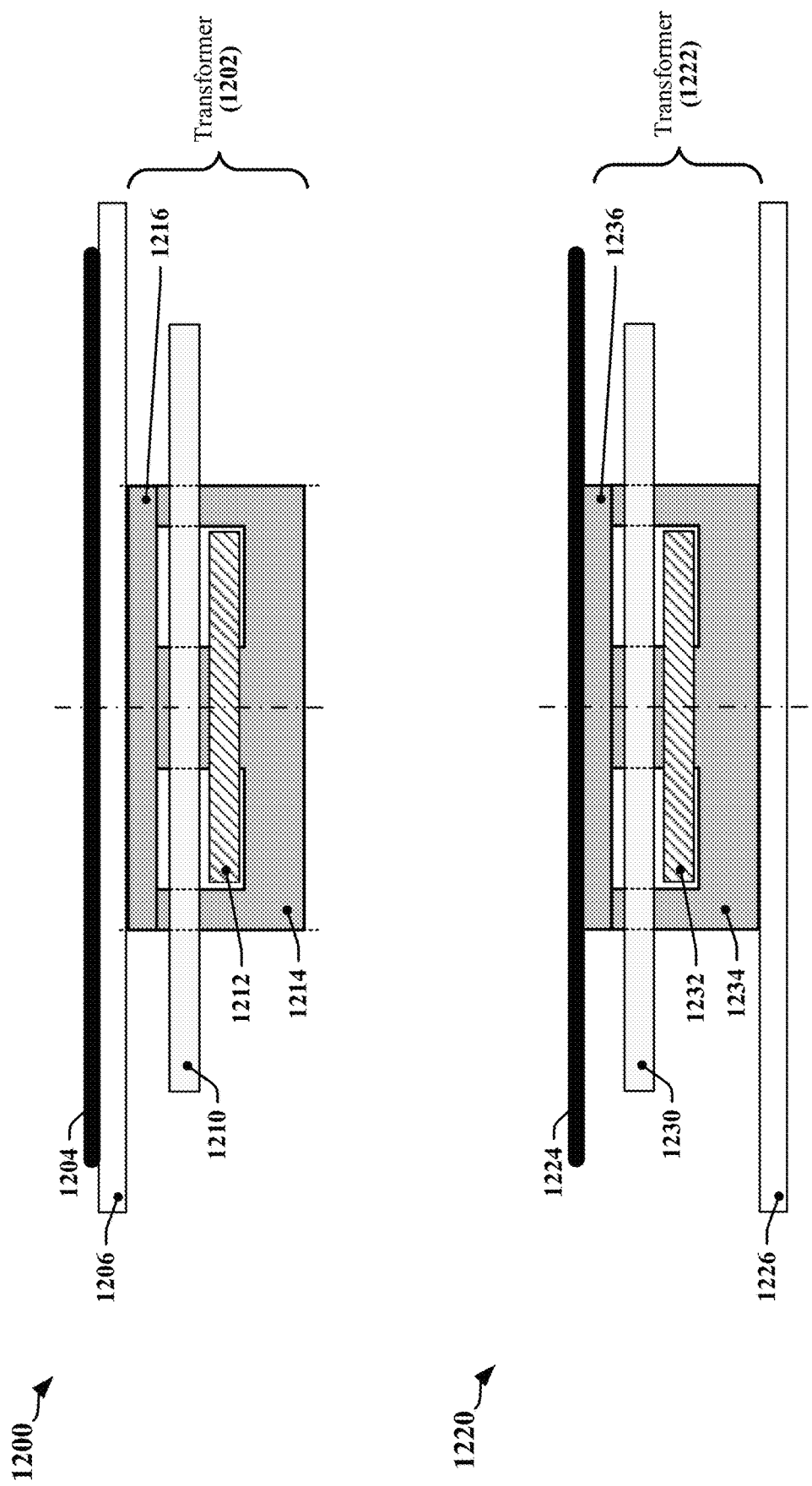
FIG. 12 illustrates third and fourth examples of charging cells that include an integrated transmitter-transformer structure in accordance with certain aspects of this disclosure.

FIG. 12 illustrates a third and fourth examples of charging cells 1200, 1220 that include an integrated transmitter-transformer structure configured in accordance with certain aspects of this disclosure. The charging cells 1200, 1220 share many features of the charging cell 1000 illustrated in FIG. 10.

In the third example, a transformer 1202 is provided in the charging cell 1200. The transformer 1202 has a magnetic core that includes both an E-shaped core section 1214 and I-shaped core section 1216. The I-shaped core section 1216 may be configured to close off or complete the magnetic core of the transformer 1202. In some instances, the I-shaped core section 1216 cooperates with a planar magnetic core 1206 to close off or complete the magnetic core of the transformer 1202. The I-shaped core section 1216 may be provided for mechanical strength and/or to improve the electromagnetic performance of the transformer 1202.

In this third example, the transformer 1202 is located below the transmitting coil 1204 and the planar magnetic core 1206. It will be appreciated that the charging cell 1220 and the planar magnetic core 1206 need not be in a horizontal inclination when in use and, further, that the terms "above" and "below" are used in a relative sense. In some implementations, the transmitting coil 1204 can be deposited on the planar magnetic core 1206 or can be otherwise bonded to the planar magnetic core 1206. In some implementations, the transmitting coil 1204 is formed in a metal layer on one surface of a PCB and the planar magnetic core 1206 is provided on an opposing surface of the PCB.

Transformer windings are provided on one or more PCBs 1210, 1212. In various implementations, the transformer windings are deployed or configured to surround or encircle a center post of the transformer 1202. The center post of the E-shaped core section 1214 may pass through holes provided in the PCBs 1210, 1212 in order to contact the planar magnetic core 1206 or to reduce the spacing between the center post and the planar magnetic core 1206. In the illustrated example, one PCB 1112 is configured to fit within the closed ends of the E-shaped core section 1214. In some examples, the ferrite wall portions of the E-shaped core section 1214 may pass through multiple holes provided one or more PCBs, including PCB 1210. In some examples, the entire E-shaped core section 1214 may pass through a large hole provided in at least one PCB 1210. In various examples, the PCBs 1210, 1212 may be fastened together using adhesive, tape, clamps or other suitable fasteners.

The transformer windings include primary windings and secondary windings. The primary windings and secondary windings can be provided on different PCBs 1210, 1212, on different surfaces of the same PCB 1210, 1212 or on the same surface of the same PCB 1210, 1212.

In the fourth example, a transformer 1222 is provided in the charging cell 1220. The transformer 1222 has a magnetic core that includes both an E-shaped core 1234 and I-shaped core section 1236. The I-shaped core section 1236 closes off or completes the magnetic core of the transformer 1222. In this fourth example, the transformer 1222 is located between the transmitting coil 1224 and the planar magnetic core 1226. As illustrated, the transformer 1222 is provided below the transmitting coil 1224 and above the planar magnetic core 1226. It will be appreciated that the charging cell 1220 and the planar magnetic core 1206 need not be in a horizontal inclination when in use and that the terms "above" and "below" are used in a relative sense. In some implementations, the transmitting coil 1224 is formed in a metal layer on one surface of a PCB.

Transformer windings are provided on one or more PCBs 1230, 1232. The transformer windings are deployed around a center post of the E-shaped core 1234. The center post of the E-shaped core 1234 may pass through holes provided in the PCBs 1230, 1232. In the illustrated example, one PCB 1112 is configured to fit within the closed ends of the E-shaped core 1234. In some examples, the ferrite portions of the E-shaped core 1234 may pass through multiple holes provided one or more PCBs, including PCB 1230. In some examples, the entire E-shaped core 1234 may pass through a large hole provided in at least one PCB 1230.

The transformer windings include primary windings and secondary windings. The primary windings and secondary windings can be provided on different PCBs 1230, 1232, on different surfaces of the same PCB 1230, 1232 or on the same surface of the same PCB 1230, 1232.

The combination of the E-shaped core section 1214 or 1234 and its corresponding I-shaped core 1216 or 1236 enable PCBs 1210, 1212, 1230, 1232 to be integrated in or mounted on a respective transformer 1202 or 1222. The PCBs 1210, 1212, 1230, 1232 may have holes that are cut or configured for mounting the respective transformers 1202, 1222. Transformer half-cores (e.g., the E-shaped core section 1214 or 1234) can have any desired geometry. The shape, size and location of a transformer half-core can be selected based on winding geometry, the number of charging cells to be supported, the number of transformers 1202, 1222 to be provided, available PCB space and other application parameters. The transformer 1202 or 1222 can be constructed or deployed at any location relative to the planar magnetic core 1226 without regard to the location of the windings of the transmitting coil 1204, 1224. Multiple transformers 1202, 1222 and transmitting coils 1204, 1224 can be located adjacent to a single planar magnetic core 1226. For example, transformers 1202 or 1222 may be placed at different locations along the plane of the corresponding planar magnetic core 1206 or 1226 based on circuit needs, available space and other factors or application requirements.

Figure 13:
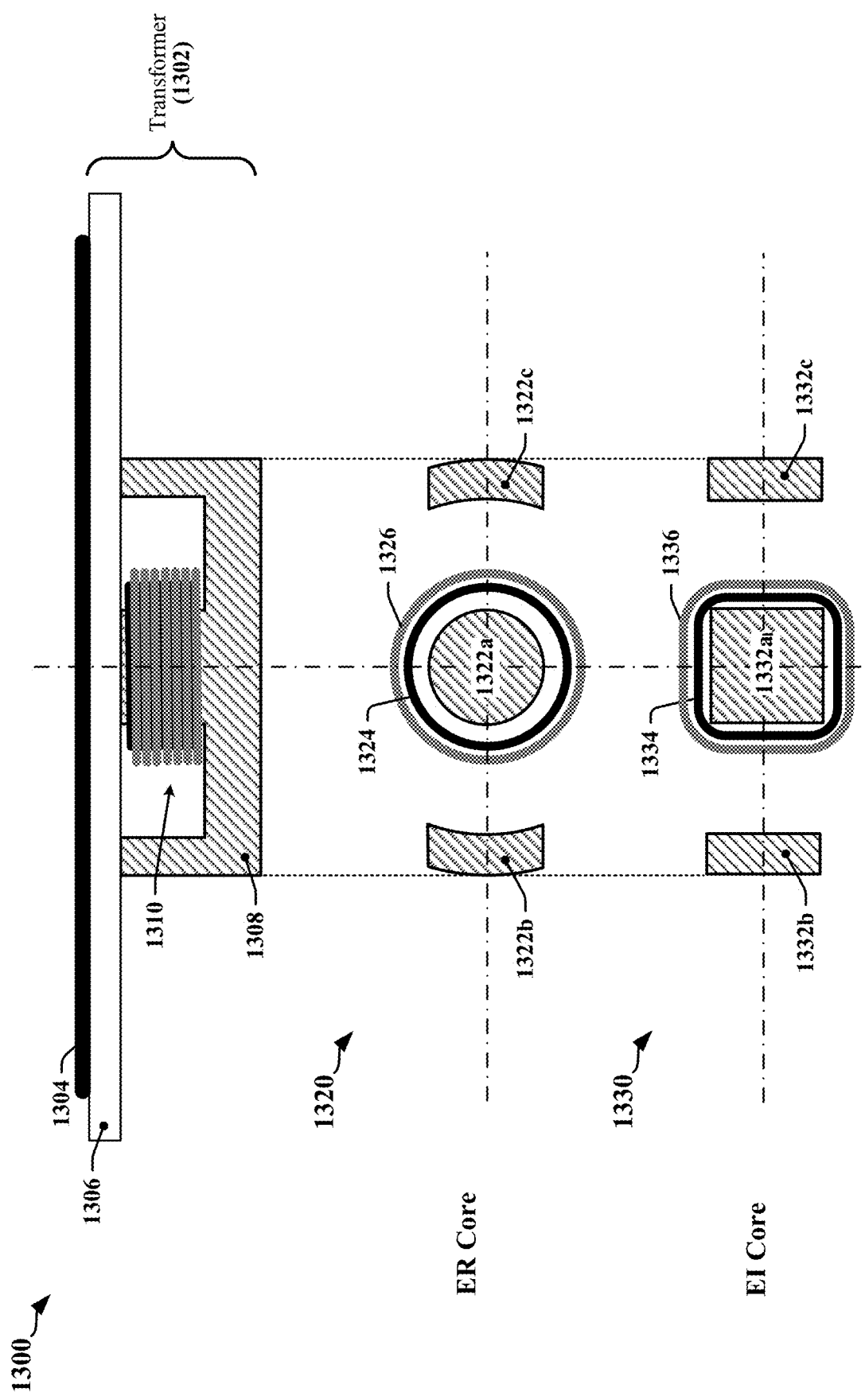
FIG. 13 illustrates a fifth example of a charging cell that includes an integrated transmitter-transformer structure in accordance with certain aspects of this disclosure.

FIG. 13 illustrates a fifth example of a charging cell 1300 that includes an integrated transmitter-transformer structure configured in accordance with certain aspects of this disclosure. The charging cell 1300 includes a transformer 1302. The transformer 1302 has a magnetic core that includes an E-shaped section 1308. The magnetic core of the transformer 1302 is completed by a planar magnetic core 1306 that closes off or otherwise completes the flux path provided by the E-shaped section 1308. The charging cell 1300 includes a wireless power transmitter that is configurable to wirelessly transmit power to a receiving chargeable device. In the illustrated example, the transmitting coil 1304 is provided above the planar magnetic core 1306 that provides the transmitter core. The transmitter and transformer 1302 share at least a portion of the planar magnetic core 1306. In the illustrated example, the transmitting coil 1304 is deposited on the planar magnetic core 1306 or is bonded to the planar magnetic core 1306. In other examples, the transmitting coil 1304 is provided in a metal layer on one surface of a PCB and the planar magnetic core 1306 is provided on an opposite surface of the PCB.

In the illustrated example, transformer windings 1310 are provided using wires that are wound around a center post of the E-shaped section 1308 or that are pre-wound and configured to slip over the center post of the E-shaped section 1308. In the first cross-sectional view 1320 of FIG. 13, the E-shaped section 1308 may be an "ER" core that has a substantially round center post 1322a and outer posts 1322b, 1322c formed as segments of a cylindrical wall. The round center post 1322a may be used with spiral or helical transformer windings 1324, 1326. In the second cross-sectional view 1330 of FIG. 13, the E-shaped section 1308 may be an "EI" core that has a substantially square or rectangular center post 1332a and substantially rectangular outer posts 1332b, 1332c. The square or rectangular center post 1332a may be suited for use with transformer windings 1334, 1336 that are configured to include straight sections with right angle turns. The structure of the center post 1322a, 1332a and configuration of the transformer windings 1324, 1326, 1334, 1336 need not match.

The transformer windings 1310 include a pair of overlaid windings that are electrically insulated from one another. In one example, the inner transformer windings 1324, 1334 may be used as primary windings and the outer transformer windings 1326, 1336 may be used as secondary windings. More than two different windings may be provided in some implementations.

The E-shaped section 1308 may be referred to as a transformer half-core. Transformer half-cores can have any desired geometry. The shape, size and location of a transformer half-core can be selected based on winding geometry, the number of charging cells to be supported, the number of transformers 1302 to be provided, available PCB space and other application parameters. A transformer 1302 can be deployed or constructed at any location under the planar magnetic core 1306 without regard to the location of transmitter windings. Multiple transformers 1302 and transmitters can share the same planar magnetic core 1306. Each transformer 1302 can be uniquely associated with a half-core and transformers 1302 are placed at different locations under the planar magnetic core 1306 based on circuit needs, available space and other factors or application requirements.

Figure 14:
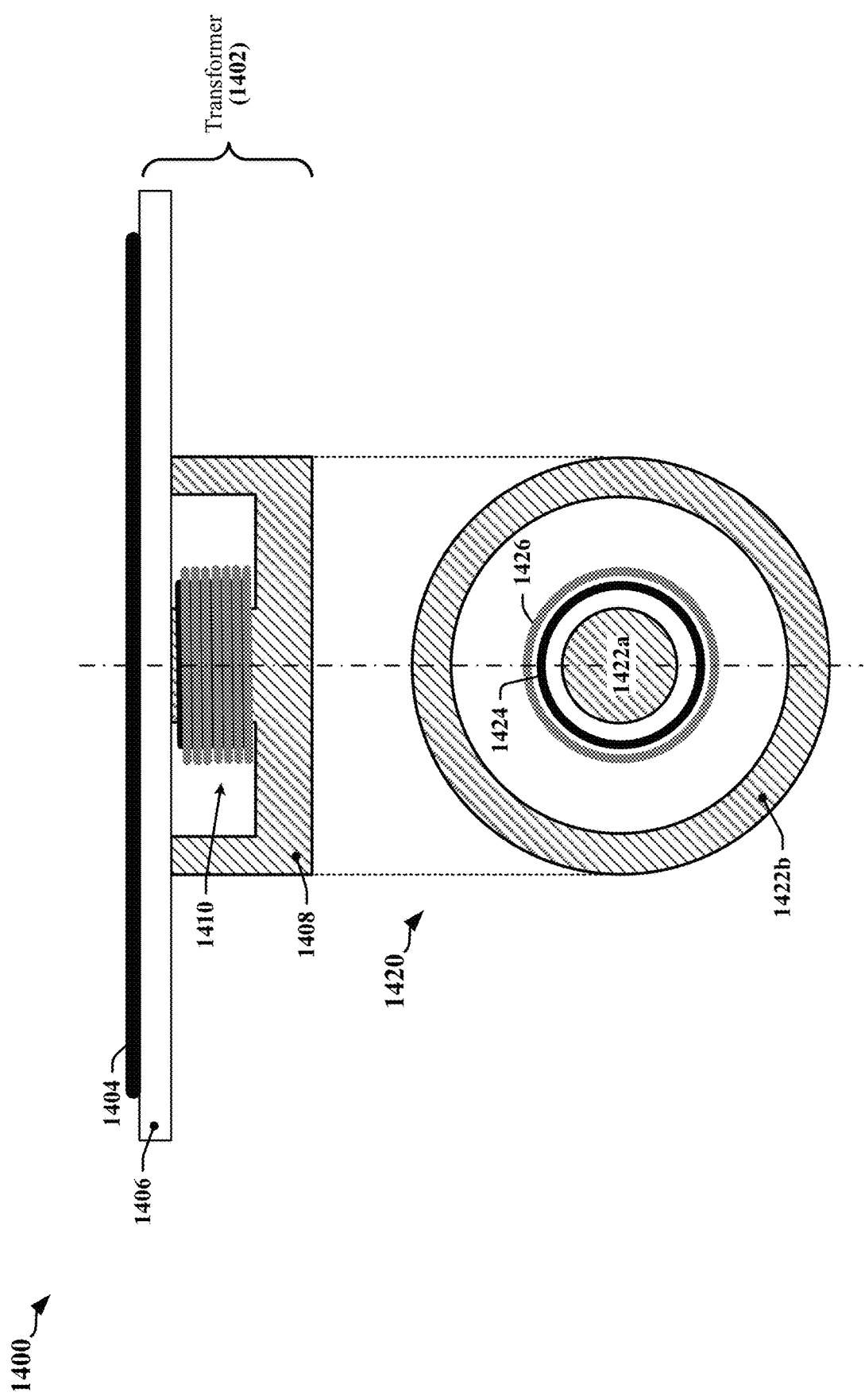
FIG. 14 illustrates a sixth example of a charging cell that includes an integrated transmitter-transformer structure in accordance with certain aspects of this disclosure.

FIG. 14 illustrates a sixth example of a charging cell 1400 that includes an integrated transmitter-transformer structure configured in accordance with certain aspects of this disclosure. The charging cell 1400 includes a transformer 1402. The transformer 1402 has a magnetic core that includes an E-shaped section 1408. The magnetic core of the transformer 1402 is completed by a planar magnetic core 1406 that closes off or otherwise completes the flux path provided by the E-shaped section 1408. The charging cell 1400 includes a wireless power transmitter that is configurable to wirelessly transmit power to a receiving chargeable device. In the illustrated example, the transmitting coil 1404 is provided above the planar magnetic core 1406 that provides the transmitter core. The transmitter and transformer 1402 share at least a portion of the planar magnetic core 1406. In the illustrated example, the transmitting coil 1404 is deposited on the planar magnetic core 1406 or bonded to the planar magnetic core 1406. In other examples, the transmitting coil 1404 is provided in a metal layer on one surface of a PCB and the planar magnetic core 1406 is provided on an opposite surface of the PCB.

In the illustrated example, transformer windings 1410 are provided using wires that are wound around a center post of the E-shaped section 1408, or that are pre-wound and configured to slip over the center post. In the cross-sectional view 1420 of FIG. 14, the E-shaped section 1408 is shown as being cylindrical in shape with a substantially round center post 1422a and wall 1422b. The round center post 1422a may be used for spiral transformer windings 1424, 1426. In some examples, the center post may have a cross-section that is oblong, polygonal, square or rectangular. The round center post 1422a may be well suited for use with helical or spiral transformer windings. The structure of the center post 1422a and the layout of the transformer windings 1424, 1426 need not match.

The transformer windings 1410 include a pair of overlaid windings that are electrically insulated from one another. In one example, the inner transformer windings 1424 may be used as primary windings and the outer transformer windings 1426 may be used as secondary windings. More than two different windings may be provided in some implementations.

The E-shaped section 1408 may be referred to as a transformer half-core. The shape, size and location of the transformer core can be selected based on winding geometry, the number of charging cells to be supported, the number of transformers 1402 to be provided, available PCB space and other application parameters. A transformer 1402 can be deployed or constructed at any location under the planar magnetic core 1406 without regard to the location of transmitter windings. Multiple transformers 1402 and transmitters can share the same planar magnetic core 1406. Each transformer 1402 can be uniquely associated with a half-core and transformers 1402 may be placed at different locations under the planar magnetic core 1406 based on circuit needs, available space and other factors or application requirements.

In the illustrated examples, a magnetic core can be shared between the transmitter and transformer 1402. The primary and secondary windings of the transformer 1402 can be provided as traces on one or more printed circuit boards or using wires wound around a post of the transformer half-core. In some examples, the primary and secondary windings of the transformer 1402 can be configured as traces on a PCB used to provide a charging surface in wireless charging device or on a secondary printed circuit board designed for use in the transformer 1402.

Example of a Processing Circuit

Figure 15:
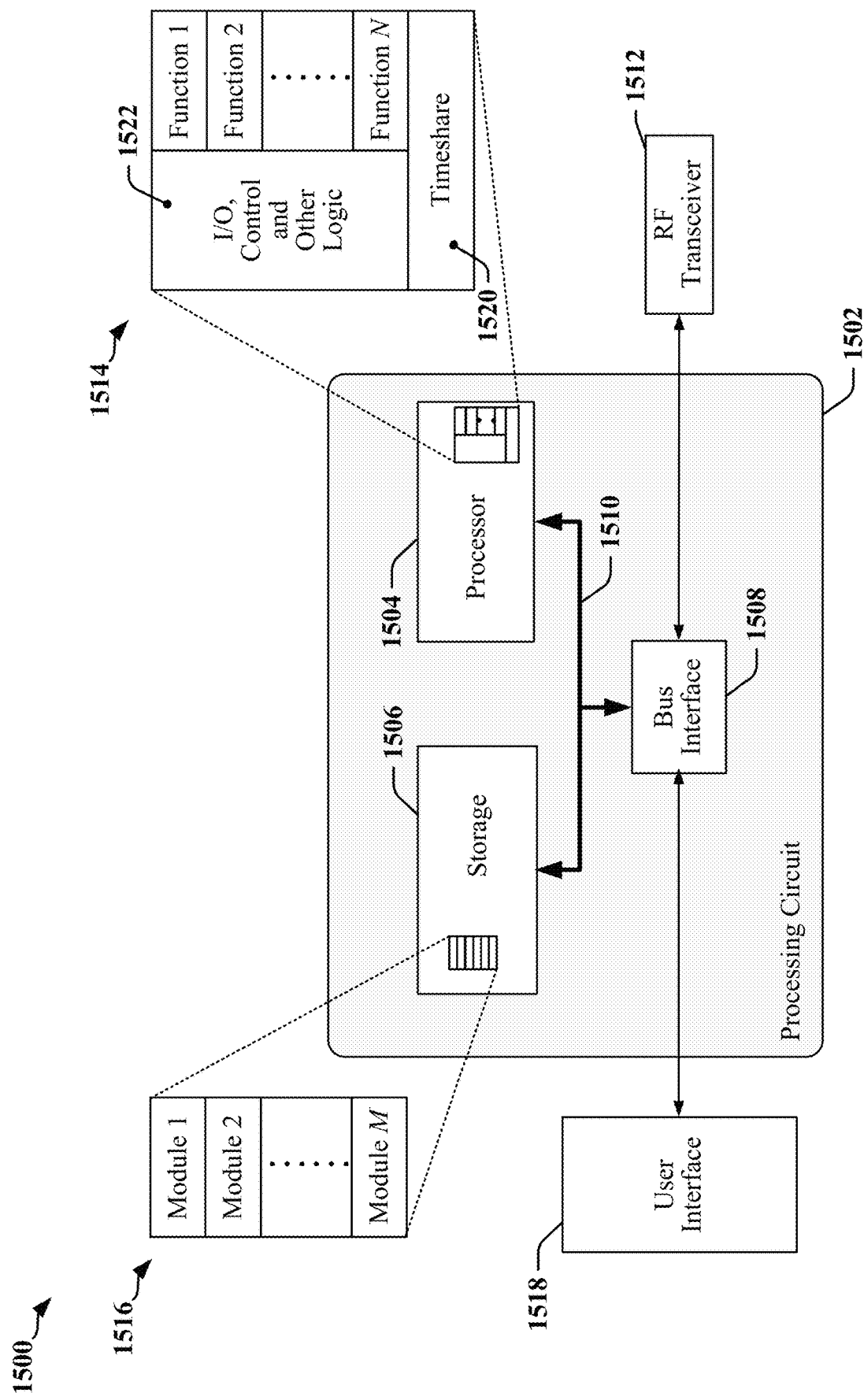
FIG. 15 illustrates one example of an apparatus employing a processing circuit that may be adapted according to certain aspects disclosed herein.

FIG. 15 illustrates an example of a hardware implementation for an apparatus 1500 that may be incorporated in a charging device or in a receiving device that enables a battery to be wirelessly charged. In some examples, the apparatus 1500 may perform one or more functions disclosed herein. In accordance with various aspects of the disclosure, an element, or any portion of an element, or any combination of elements as disclosed herein may be implemented using a processing circuit 1502. The processing circuit 1502 may include one or more processors 1504 that are controlled by some combination of hardware and software modules. Examples of processors 1504 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The storage 1506 may include transitory storage media and/or non-transitory storage media.

The bus 1510 may also link various other circuits such as timing sources, timers, peripherals, voltage regulators, and power management circuits. A bus interface 1508 may provide an interface between the bus 1510 and one or more transceivers 1512. In one example, a transceiver 1512 may be provided to enable the apparatus 1500 to communicate with a charging or receiving device in accordance with a standards-defined protocol. Depending upon the nature of the apparatus 1500, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer-readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain and/or organize software in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as a transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to a transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

In one implementation, the apparatus 1500 includes or operates as a wireless charging device that has a battery charging power source coupled to a charging circuit, a plurality of charging cells and a controller, which may be included in one or more processors 1504. The plurality of charging cells may be configured to provide a charging surface. At least one coil may be configured to direct an electromagnetic field through a charge transfer area of each charging cell.

In various examples, the charging device includes a charging circuit, at least one printed circuit board, and one or more charging cells configured to receive a charging current from the charging circuit and to transmit power to a receiving device when a charging current is received from the charging circuit.

In one example, the charging device includes a power transmitting coil, a transformer and a driver circuit. The power transmitting coil may be configured to produce an electromagnetic flux centered on an axis that is substantially perpendicular to a plane surface of the planar magnetic core. The transformer may be located adjacent to the planar magnetic core and the driver circuit may be configured to use a stepped-up voltage received from the transformer to provide a charging current to the power transmitting coil.

In certain examples, the planar magnetic core is located in a plane parallel to a plane of the power transmitting coil. The power transmitting coil may overlap at least a portion of the planar magnetic core. The planar magnetic core may be located in a plane parallel to a surface of a printed circuit board that carries the power transmitting coil.

In certain implementations, the transformer includes a magnetic half-core that contacts the planar magnetic core such that the planar magnetic core completes a magnetic path through the magnetic half-core. In some examples, magnetic path through the magnetic half-core may be completed when a center post of the magnetic half-core contacts the magnetic half-core. The magnetic half-core may have plural posts oriented perpendicular to the planar magnetic core. The magnetic path through the magnetic half-core may be completed when the plurality of posts contacts the magnetic half-core. The magnetic half-core may have an outer wall portion oriented perpendicular to the planar magnetic core. The magnetic path through the magnetic half-core may be completed when the outer wall portion contacts the magnetic half-core. In some examples, the center post of the magnetic half-core is configured to contact a surface of a printed circuit board that carries the planar magnetic core. The magnetic half-core may have an outer wall portion oriented perpendicular to the planar magnetic core and configured to contact the surface of the printed circuit board that carries the planar magnetic core.

In certain implementations, the planar magnetic core is configured to conduct magnetic flux generated by the power transmitting coil when the charging current is provided by the driver circuit. The planar magnetic core may be configured to conduct first magnetic flux generated by the power transmitting coil while conducting second magnetic flux induced in the magnetic half-core.

In certain implementations, the charging device has one or more printed circuit boards and primary and secondary windings. Each printed circuit board may have a hole therein configured to allow a center post of the magnetic half-core to pass through the one or more printed circuit boards. At least one primary winding includes a trace on a first metal layer provided by the one or more printed circuit boards. At least one secondary winding includes a trace on a second metal layer provided by the one or more printed circuit boards. The first metal layer and the second metal layer may be provided on the same printed circuit board. The first metal layer and the second metal layer may be provided on different printed circuit boards. The hole in each printed circuit boards may be coaxial with the primary winding or the secondary winding.

Figure 16:
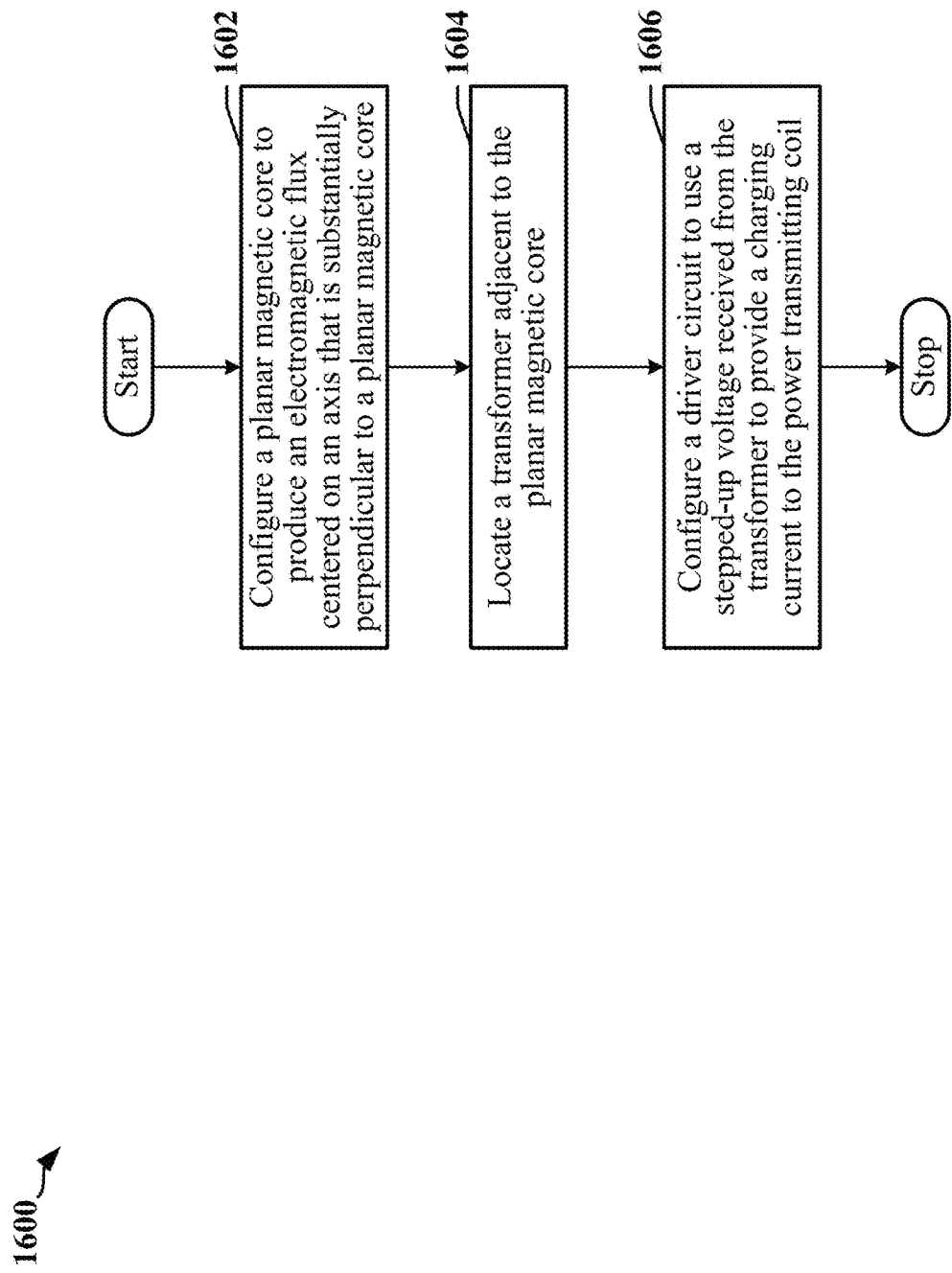
FIG. 16 illustrates a method for configuring a charging device in accordance with certain aspects of this disclosure.

FIG. 16 is a flowchart 1600 illustrating a method for configuring a charging device. At block 1602, a planar magnetic core may be configured to produce an electromagnetic flux centered on an axis that is substantially perpendicular to a planar magnetic core. The power transmitting coil may be provided in a wireless charging device. In some instances, the wireless charging device has multiple power transmitting coils and may be capable of concurrently charging multiple free-positioned chargeable devices. The planar magnetic core may be located in a plane parallel to a plane of the power transmitting coil. The power transmitting coil may overlap at least a portion of the planar magnetic core. In one example, the planar magnetic core may have a sufficiently large area to enable it to provide a transmitting magnetic core for multiple power transmitting coils. The planar magnetic core may be located in a plane parallel to a surface of a printed circuit board that carries one or more of the power transmitting coils.

At block 1604, a transformer may be located adjacent to the planar magnetic core. At block 1606, a driver circuit may be configured to use a stepped-up voltage received from the transformer to provide a charging current to the power transmitting coil.

In some examples, a magnetic half-core of the transformer is configured to contact the planar magnetic core such that the planar magnetic core completes a magnetic path through the magnetic half-core. A center post of the magnetic half-core may be configured such that an axis of the center post that is oriented perpendicular to the planar magnetic core. In one example, the center post is cylindrical. In another example, the center post has a rectangular or square cross-section.

In certain examples, a charging current may be provided to the power transmitting coil and, responsive to the charging current, the power transmitting coil may induce a first magnetic flux in the magnetic half-core while a second magnetic flux is induced in the magnetic half-core by current flowing through the transformer.

In some examples, the power transmitting coil may be included in a charging cell of the wireless charging device. The wireless charging device may include or incorporate at least one PCB that has a hole provided therein to allow the center post of the magnetic half-core to pass through the PCB. Each hole may be coaxial with the primary winding and/or the secondary winding wound around a center post. A primary winding of the transformer may include a trace on a first metal layer provided by the at least one printed circuit board and a secondary winding of the transformer that includes a trace on a second metal layer provided by the at least one printed circuit board. In one example, the first and second metal layers are provided on the same printed circuit board. In another example, the first and second metal layers are provided on different printed circuit boards.

In some examples, the magnetic path through the magnetic half-core is completed when the center post of the magnetic half-core contacts the magnetic half-core. The magnetic half-core may have a plurality of posts oriented perpendicular to the planar magnetic core. The magnetic path through the magnetic half-core may be completed when the plurality of posts contacts the magnetic half-core.

In some examples, the magnetic path through the magnetic half-core is completed when the center post and an outer wall portion of the magnetic half-core contact the magnetic half-core. The outer wall portion may be oriented perpendicular to the planar magnetic core.

In some examples, the magnetic path through the magnetic half-core is completed when the center post of the magnetic half-core contacts a surface of a printed circuit board that carries the planar magnetic core. The magnetic half-core may have a plurality of posts oriented perpendicular to the planar magnetic core. The magnetic path through the magnetic half-core may be completed when the plurality of posts contacts the surface of a printed circuit board that carries the planar magnetic core.

In some examples, the magnetic path through the magnetic half-core is completed when the center post and outer wall portion of the magnetic half-core contact the surface of a printed circuit board that carries the planar magnetic core. The outer wall portion may be oriented perpendicular to the planar magnetic core.

The planar magnetic core may be configured to conduct magnetic flux generated by the power transmitting coil when the charging current is provided by the driver circuit. The planar magnetic core may be configured to conduct the first magnetic flux generated by the power transmitting coil while conducting second magnetic flux induced in the magnetic half-core.

Some implementation examples are described in the following numbered clauses:

1. A charging device, comprising: a power transmitting coil configured to produce an electromagnetic flux centered on an axis that is substantially perpendicular to a planar magnetic core; a transformer located adjacent to the planar magnetic core; and a driver circuit configured to use a stepped-up voltage received from the transformer to provide a charging current to the power transmitting coil.
2. The charging device as described in clause 1, wherein the planar magnetic core is located in a plane parallel to a plane of the power transmitting coil, the power transmitting coil overlapping at least a portion of the planar magnetic core.
3. The charging device as described in clause 1 or clause 2, wherein the planar magnetic core is located in a plane parallel to a surface of a printed circuit board that carries the power transmitting coil.
4. The charging device as described in any of clauses 1-3, wherein the planar magnetic core is configured to conduct magnetic flux generated by the power transmitting coil when the charging current is provided by the driver circuit.
5. The charging device as described in any of clauses 1-3, wherein the transformer comprises: a magnetic half-core that contacts the planar magnetic core such that the planar magnetic core completes a magnetic path through the magnetic half-core.
6. The charging device as described in clause 5, wherein the planar magnetic core is configured to conduct first magnetic flux generated by the power transmitting coil while conducting second magnetic flux induced in the magnetic half-core.
7. The charging device as described in clause 5 or clause 6, wherein the magnetic path through the magnetic half-core is completed when a center post of the magnetic half-core contacts the magnetic half-core.
8. The charging device as described in any of clauses 5-7, wherein the magnetic half-core has a plurality of posts oriented perpendicular to the planar magnetic core, and wherein the magnetic path through the magnetic half-core is completed when the plurality of posts contacts the magnetic half-core.
9. The charging device as described in any of clauses 5-8, wherein the magnetic half-core has an outer wall portion oriented perpendicular to the planar magnetic core, and wherein the magnetic path through the magnetic half-core is completed when the outer wall portion contacts the magnetic half-core.
10. The charging device as described in any of clauses 5-9, wherein a center post of the magnetic half-core is configured to contact a surface of a printed circuit board that carries the planar magnetic core.
11. The charging device as described in clause 10, wherein the magnetic half-core has an outer wall portion oriented perpendicular to the planar magnetic core and configured to contact the surface of the printed circuit board that carries the planar magnetic core.
12. The charging device as described in any of clauses 5-11, further comprising: one or more printed circuit boards, each of the one or more printed circuit boards having a hole configured to allow a center post of the magnetic half-core to pass through the one or more printed circuit boards; a primary winding that includes a trace on a first metal layer provided by the one or more printed circuit boards; and a secondary winding that includes a trace on a second metal layer provided by the one or more printed circuit boards.
13. The charging device as described in clause 12, wherein the first metal layer and the second metal layer are provided on a same printed circuit board.
14. The charging device as described in clause 12, wherein the first metal layer and the second metal layer are provided on different printed circuit boards.
15. The charging device as described in any of clauses 12-14, wherein the hole in each of the one or more printed circuit boards is coaxial with the primary winding or the secondary winding.
16. A method for configuring a charging device, comprising: configuring a power transmitting coil to produce a magnetic flux centered on an axis that is substantially perpendicular to a planar magnetic core; locating a transformer adjacent to the planar magnetic core; and configuring a driver circuit to use a stepped-up voltage received from the transformer to provide a charging current to the power transmitting coil.
17. The method as described in clause 16, wherein locating the transformer adjacent to the planar magnetic core comprises: causing a magnetic half-core of the transformer to contact the planar magnetic core such that the planar magnetic core completes a magnetic path through the magnetic half-core.
18. The method as described in clause 17, wherein the charging device comprises: one or more printed circuit boards, each of the one or more printed circuit boards having a hole configured to allow a center post of the magnetic half-core to pass through the one or more printed circuit boards; a primary winding that includes a trace on a first metal layer provided by the one or more printed circuit boards; and a secondary winding that includes a trace on a second metal layer provided by the one or more printed circuit boards.

19. The method as described in any of clauses 16-18, further comprising: providing a charging current to the power transmitting coil, wherein, responsive to the charging current the power transmitting coil induces first magnetic flux in the planar magnetic core while second magnetic flux is induced in the planar magnetic core by current flowing through the transformer.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A charging device, comprising:
   a power transmitting coil configured to produce an electromagnetic flux centered on an axis that is substantially perpendicular to a planar magnetic core;
   a transformer located adjacent to the planar magnetic core, wherein the transformer comprises a magnetic half-core that contacts the planar magnetic core such that the planar magnetic core completes a magnetic path through the magnetic half-core;
   a driver circuit configured to use a stepped-up voltage received from the transformer to provide a charging current to the power transmitting coil;
   one or more printed circuit boards, each of the one or more printed circuit boards having a hole configured to allow a center post of the magnetic half-core to pass through the one or more printed circuit boards;
   a primary winding that includes a trace on a first metal layer provided by the one or more printed circuit boards; and
   a secondary winding that includes a trace on a second metal layer provided by the one or more printed circuit boards.

2. The charging device of claim 1, wherein the planar magnetic core is located in a plane parallel to a plane of the power transmitting coil, the power transmitting coil overlapping at least a portion of the planar magnetic core.

3. The charging device of claim 1, wherein the planar magnetic core is located in a plane parallel to a surface of a printed circuit board that carries the power transmitting coil.

4. The charging device of claim 1, wherein the planar magnetic core is configured to conduct magnetic flux generated by the power transmitting coil when the charging current is provided by the driver circuit.

5. The charging device of claim 1, wherein the planar magnetic core is configured to conduct first magnetic flux generated by the power transmitting coil while conducting second magnetic flux induced in the magnetic half-core.

6. The charging device of claim 1, wherein the magnetic path through the magnetic half-core is completed when a center post of the magnetic half-core contacts the magnetic half-core.

7. The charging device of claim 1, wherein the magnetic half-core has a plurality of posts oriented perpendicular to the planar magnetic core, and wherein the magnetic path through the magnetic half-core is completed when the plurality of posts contacts the magnetic half-core.

8. The charging device of claim 1, wherein the magnetic half-core has an outer wall portion oriented perpendicular to the planar magnetic core, and wherein the magnetic path through the magnetic half-core is completed when the outer wall portion contacts the magnetic half-core.

9. The charging device of claim 1, wherein a center post of the magnetic half-core is configured to contact a surface of a printed circuit board that carries the planar magnetic core.

10. The charging device of claim 9, wherein the magnetic half-core has an outer wall portion oriented perpendicular to the planar magnetic core and configured to contact the surface of the printed circuit board that carries the planar magnetic core.

11. The charging device of claim 1, wherein the first metal layer and the second metal layer are provided on a same printed circuit board.

12. The charging device of claim 1, wherein the first metal layer and the second metal layer are provided on different printed circuit boards.

13. The charging device of claim 1, wherein the hole in each of the one or more printed circuit boards is coaxial with the primary winding or the secondary winding.

14. A method for configuring a charging device, comprising:
   configuring a power transmitting coil to produce a magnetic flux centered on an axis that is substantially perpendicular to a planar magnetic core;
   locating a transformer adjacent to the planar magnetic core, wherein the transformer comprises a magnetic half-core that contacts the planar magnetic core such that the planar magnetic core completes a magnetic path through the magnetic half-core; and
   configuring a driver circuit to use a stepped-up voltage received from the transformer to provide a charging current to the power transmitting coil,
   wherein the charging device comprises:
      one or more printed circuit boards, each of the one or more printed circuit boards having a hole configured to allow a center post of the magnetic half-core to pass through the one or more printed circuit boards,
      a primary winding that includes a trace on a first metal layer provided by the one or more printed circuit boards; and
      a secondary winding that includes a trace on a second metal layer provided by the one or more printed circuit boards.

15. The method of claim 14, wherein locating the transformer adjacent to the planar magnetic core comprises:

causing a magnetic half-core of the transformer to contact the planar magnetic core such that the planar magnetic core completes a magnetic path through the magnetic half-core.

16. The method of claim 14, further comprising:

providing a charging current to the power transmitting coil, wherein, responsive to the charging current the power transmitting coil induces first magnetic flux in the planar magnetic core while second magnetic flux is induced in the planar magnetic core by current flowing through the transformer.

* * * * *